United States Patent
Wang et al.

(10) Patent No.: US 11,405,816 B2
(45) Date of Patent: Aug. 2, 2022

(54) METHOD AND APPARATUS FOR CONFIGURING A RELAY NODE

(71) Applicant: Samsung Electronics Co., Ltd., Suwon-si (KR)

(72) Inventors: Weiwei Wang, Beijing (CN); Hong Wang, Beijing (CN); Lixiang Xu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 109 days.

(21) Appl. No.: 17/045,478

(22) PCT Filed: Apr. 4, 2019

(86) PCT No.: PCT/KR2019/003985
§ 371 (c)(1),
(2) Date: Oct. 5, 2020

(87) PCT Pub. No.: WO2019/194596
PCT Pub. Date: Oct. 10, 2019

(65) Prior Publication Data
US 2021/0176658 A1     Jun. 10, 2021

(30) Foreign Application Priority Data

Apr. 4, 2018 (CN) .......................... 201810305260.8
Feb. 14, 2019 (CN) .......................... 201910116790.2

(51) Int. Cl.
*H04L 12/28* (2006.01)
*H04W 28/02* (2009.01)
(Continued)

(52) U.S. Cl.
CPC ........ *H04W 28/0252* (2013.01); *H04B 7/155* (2013.01); *H04L 41/0803* (2013.01); *H04W 76/12* (2018.02)

(58) Field of Classification Search
None
See application file for complete search history.

(56) References Cited

U.S. PATENT DOCUMENTS 8,724,470 B2 * 5/2014 Yi .......................... H04L 47/17
370/328
2011/0235514 A1 9/2011 Huang et al.
(Continued)

FOREIGN PATENT DOCUMENTS

EP     3294038 A1     3/2018

OTHER PUBLICATIONS

Samsung Electronics R&D Institute UK, "Adaptation layer placement in the protocol stack", 3GPP TSG-RAN WG2 #102, May 21-25, 2018, R2-1807824, 4 pages.
(Continued)

*Primary Examiner* — Gerald A Smarth

(57) ABSTRACT

The disclosure relates to a pre-5th-Generation (5G) or 5G communication system to be provided for supporting higher data rates Beyond 4th-Generation (4G) communication system such as Long Term Evolution (LTE). The disclosure provides a method and apparatus for configuring a relay node. A first node transmits to a second node a message that carries information on a radio bearer for a user accessing the second node. Configuration of the radio bearer for data transmission in a multi-hop network is realized through the above method and apparatus.

20 Claims, 11 Drawing Sheets

(51) Int. Cl.
*H04W 76/12* (2018.01)
*H04B 7/155* (2006.01)
*H04L 41/0803* (2022.01)

(56) References Cited

U.S. PATENT DOCUMENTS

| | | |
|---|---|---|
| 2011/0267943 A1 | 11/2011 | Huang et al. |
| 2012/0127863 A1 | 5/2012 | Yi et al. |
| 2014/0003328 A1 | 1/2014 | Mildh et al. |
| 2019/0215055 A1* | 7/2019 | Majmundar ....... H04B 7/15521 |
| 2019/0223002 A1* | 7/2019 | Novlan .................. H04W 8/22 |
| 2019/0289445 A1* | 9/2019 | Wang ................... H04W 24/10 |

OTHER PUBLICATIONS

Samsung, "Discussion on Bearer mapping between UE DRB and IAB DRB", 3GPP TSG-RAN WG2 Meeting #102, May 21-25, 2018, R2-1807550, 5 pages.

Samsung Electronics R&D Institute UK (rapporteur), "Outcome of e-mail discussion [AH1807#08][IAB]: TP for TR 38.874 on Adaptation Layer", 3GPP TSG-RAN WG2 NR ad-hoc #18-07, Jul. 2-6, 2018, R2-1810973, 3 pages.

International Search Report dated Jul. 18, 2019 in connection with International Patent Application No. PCT/KR2019/003985, 3 pages.

Written Opinion of the International Searching Authority dated Jul. 18, 2019 in connection with International Patent Application No. PCT/KR2019/003985, 4 pages.

\* cited by examiner

[Fig. 1]
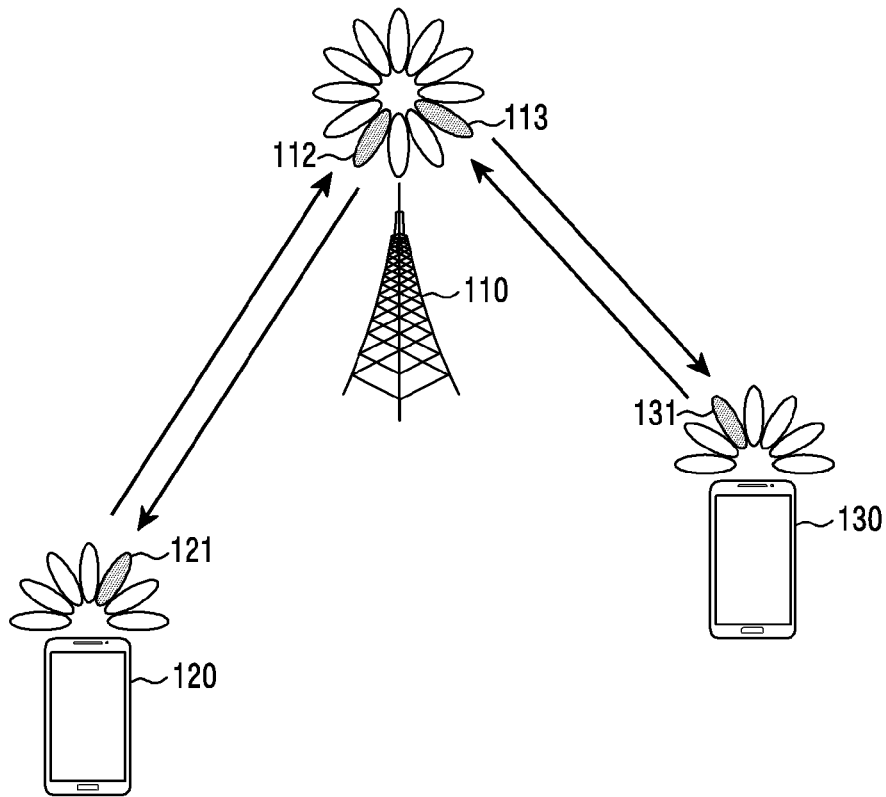
[Fig. 2]
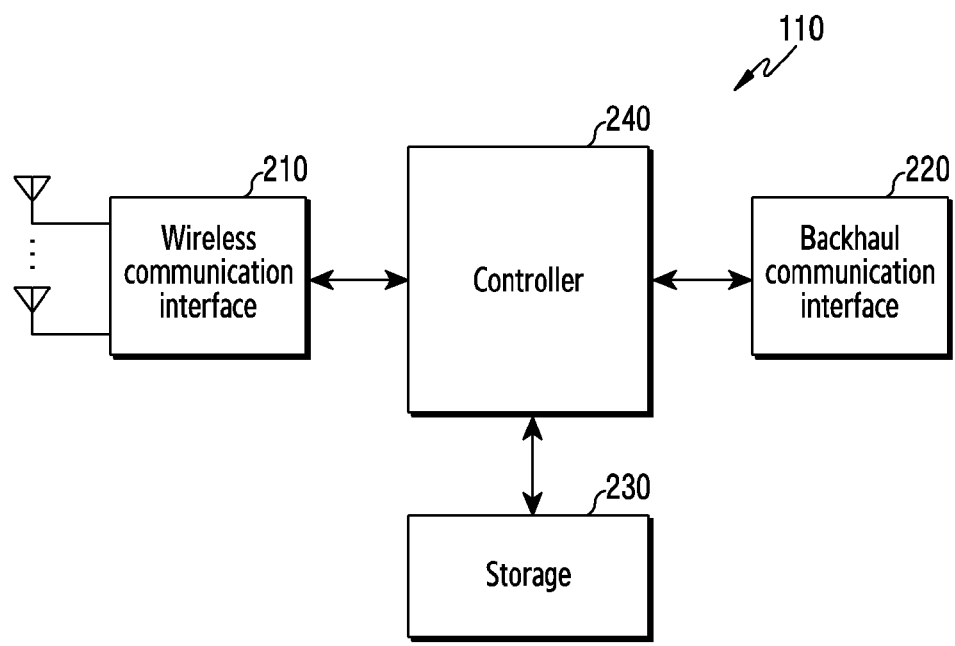

[Fig. 3]
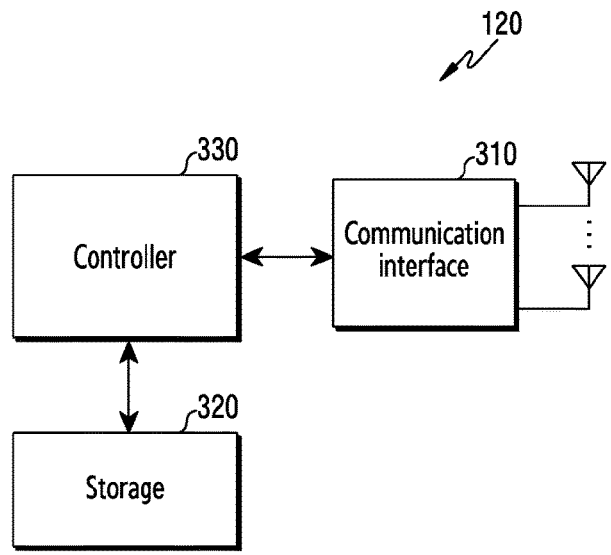
[Fig. 4]
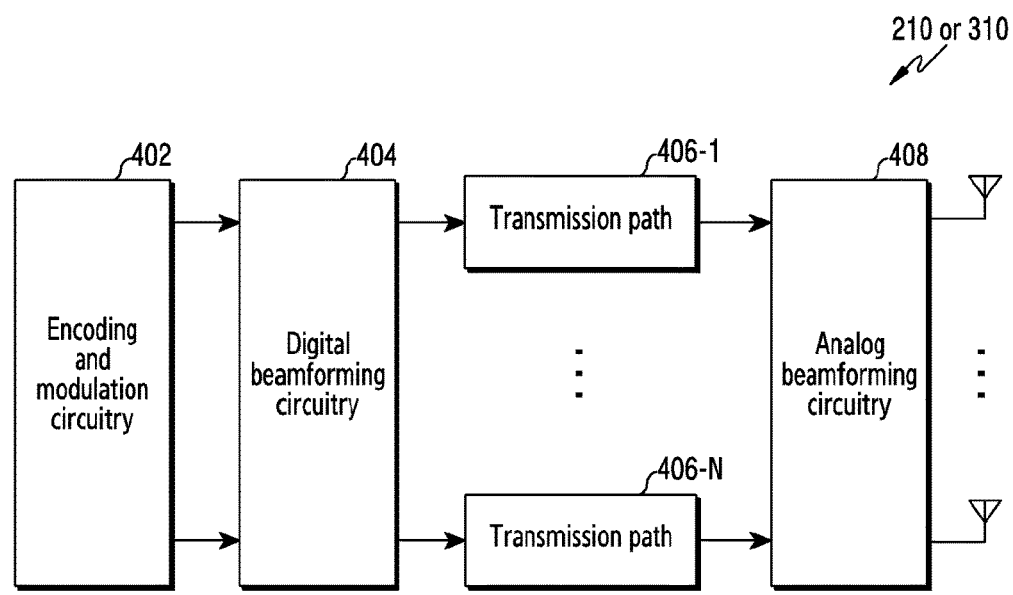
[Fig. 5]
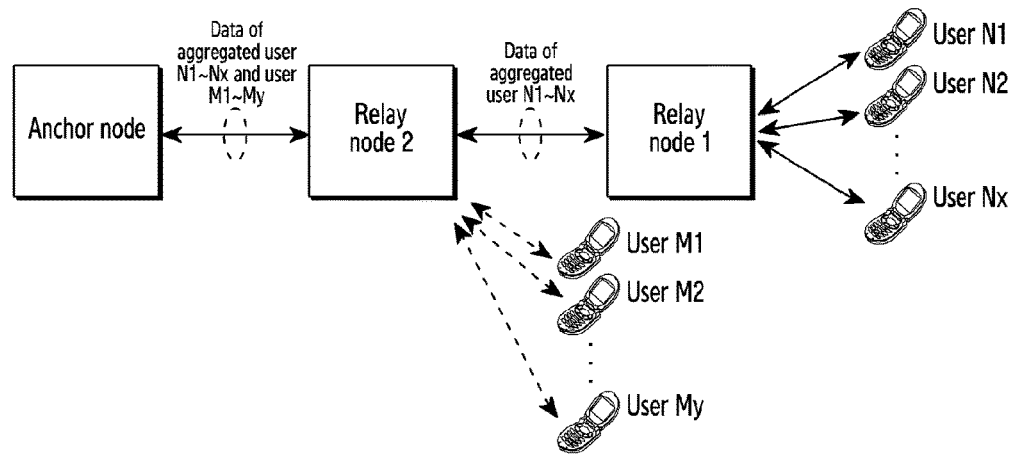

[Fig. 6]

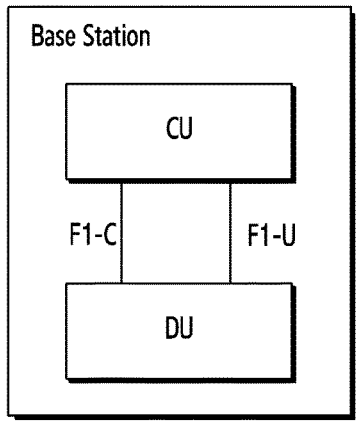

[Fig. 7]

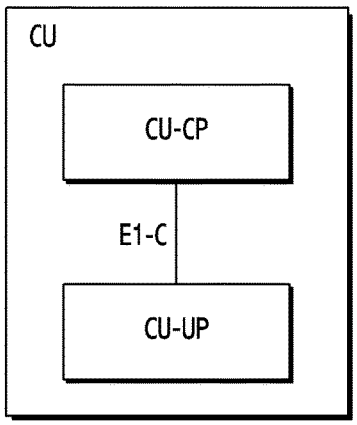

[Fig. 8]

a first node transmits to a second node a message which carries information on a radio bearer for a user accessing the second node — S810

[Fig. 9]

a second node receives a message that is transmitted by a first node and carries information on a radio bearer for a user accessing the second node — S910

[Fig. 10]

a third node receives a message that is transmitted by a first node and carries information on a radio bearer for the third node — S1010

[Fig. 11]

> a first node transmits to a third node a message carrying the information on a radio bearer for the third node — S1110

[Fig. 12]

> a user plane portion of a first node receives or transmits control signaling from or to a control plane portion of the first node via a control plane message, or the user plane portion of the first node receives or transmits control signaling from or to a second node via a user plane message — S1210

[Fig. 13]

> a control plane portion of a first node receives or transmits control signaling from or to a user plane portion of the first node via a control plane message — S1310

[Fig. 14]

> a second node receives or transmits control signaling from or to a user plane portion of a first node via a user plane message — S1410

[Fig. 15]

> a second node transmits control signaling to a first node via a control plane message, wherein the control signaling is received over a data radio bearer or a data radio bearer for sending the control signaling; or a second node transmits control signaling to a third node over a data radio bearer or a data radio bearer for sending the control signaling, wherein the control signaling is received via a control plane message — S1510

[Fig. 16]
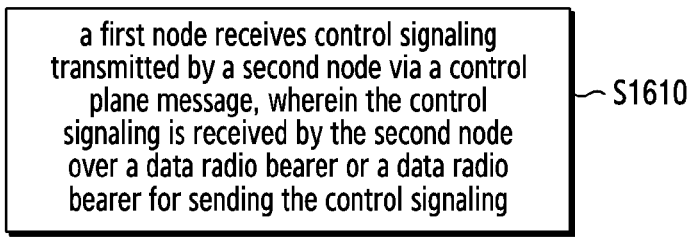
[Fig. 17]
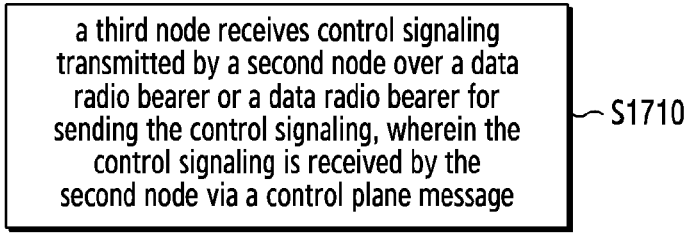
[Fig. 18]
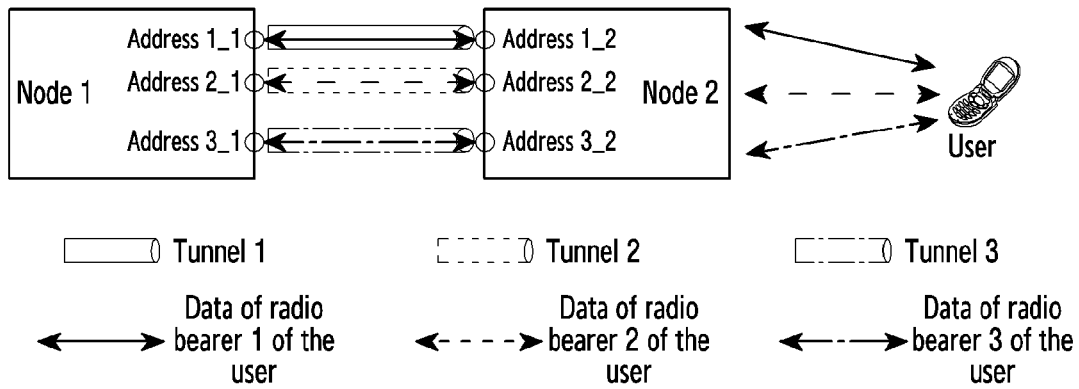
[Fig. 19]
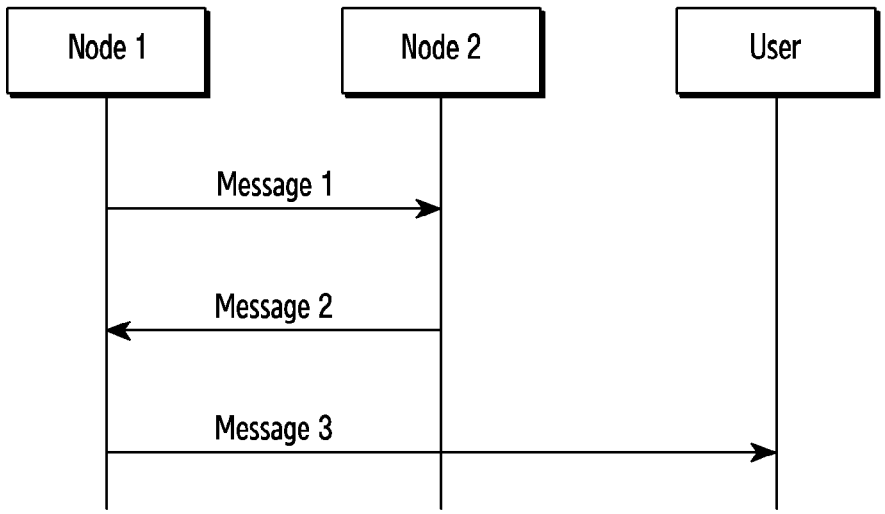

[Fig. 20]
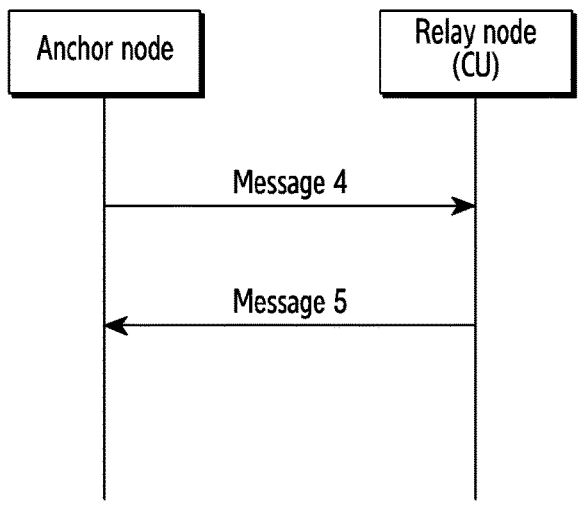
[Fig. 21]
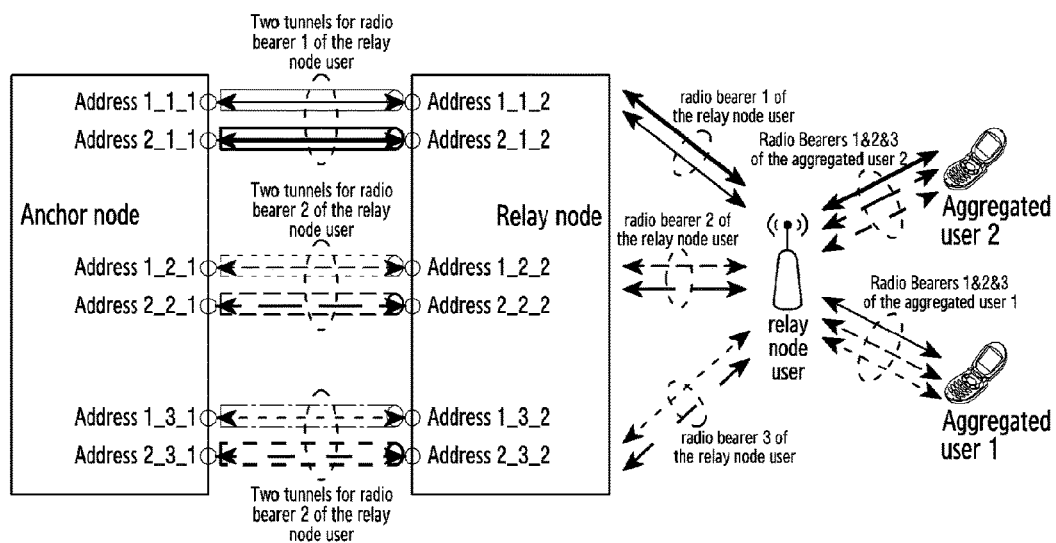
[Fig. 22]
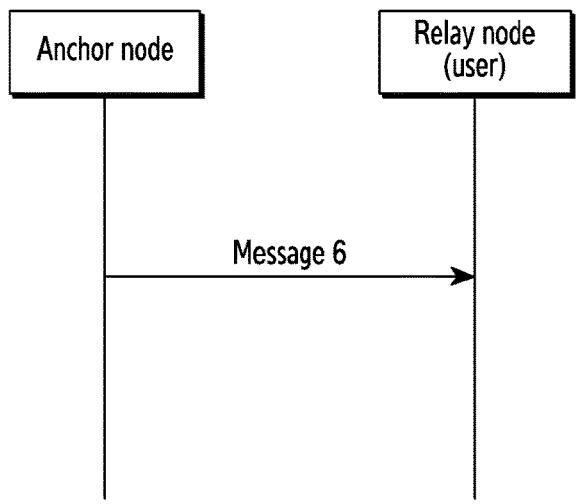

[Fig. 23]
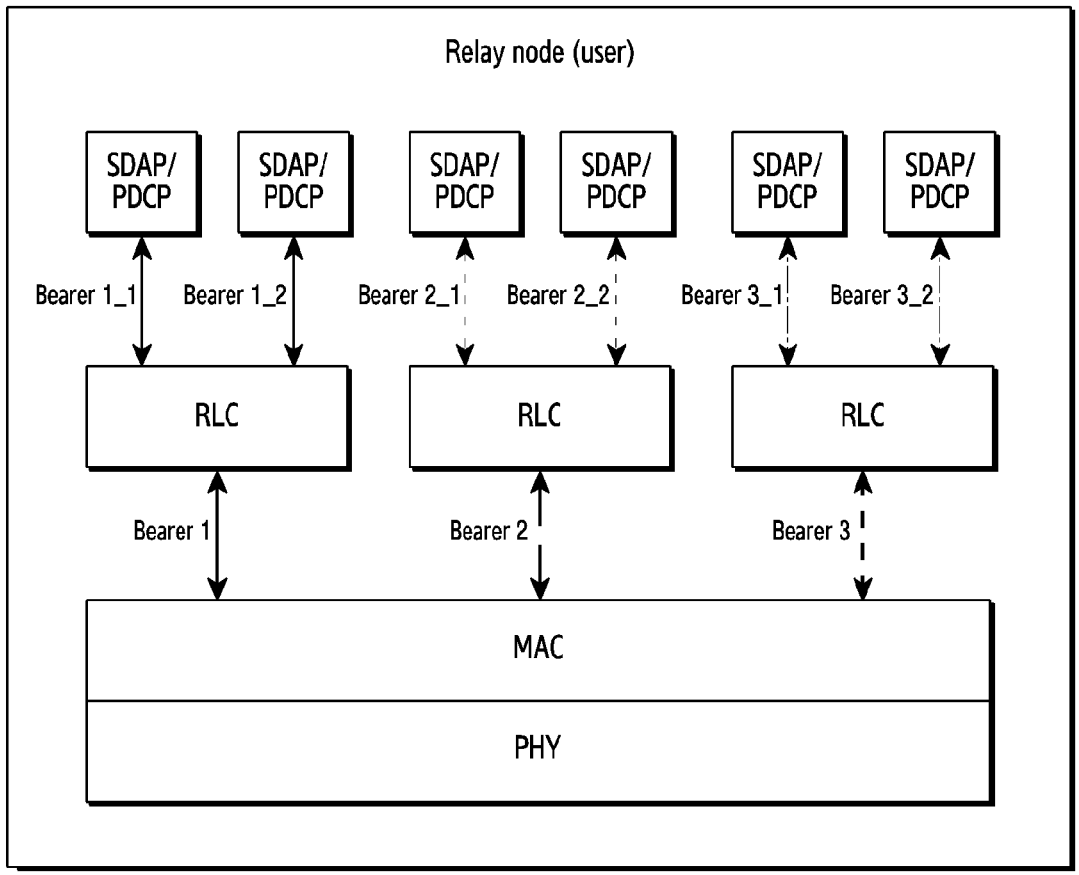
[Fig. 24]
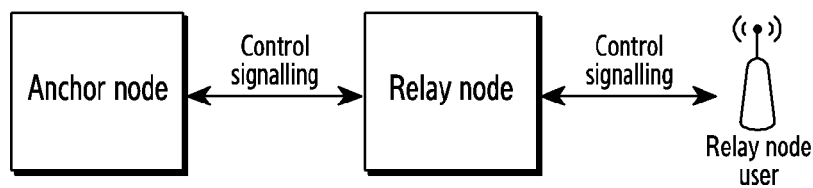
[Fig. 25]
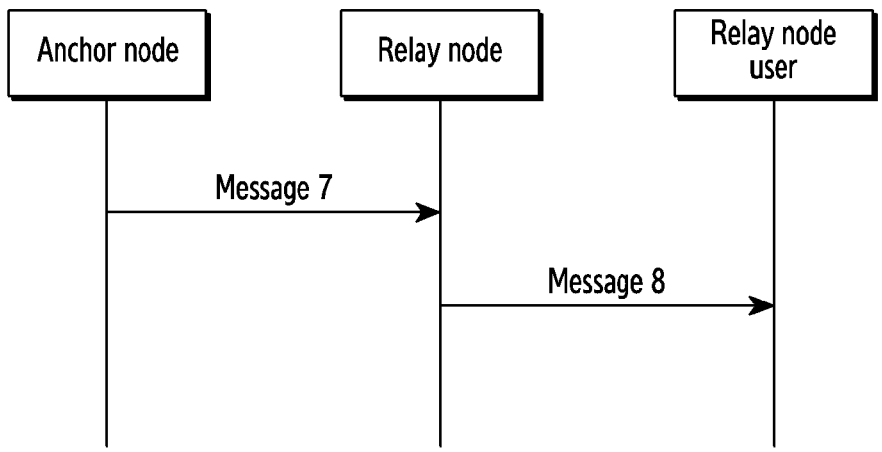

[Fig. 26]
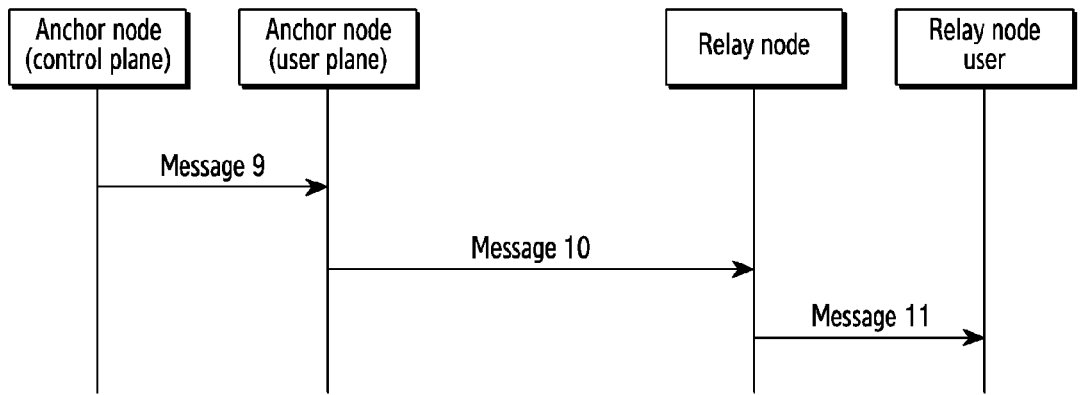
[Fig. 27]
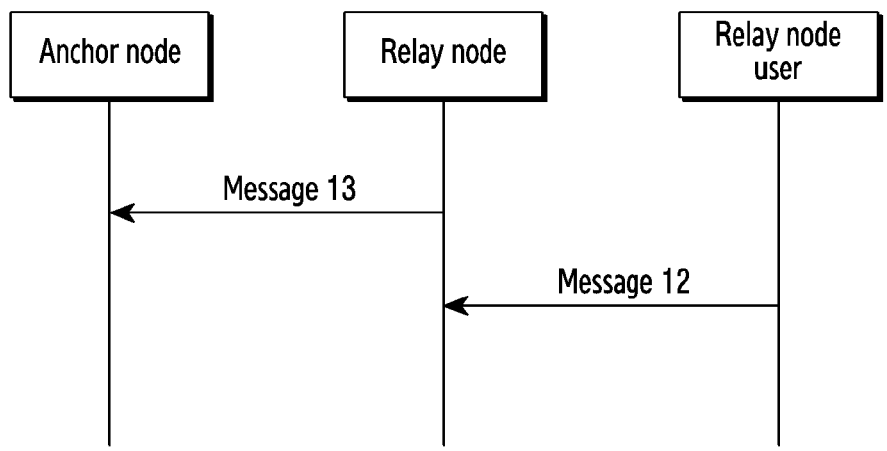
[Fig. 28A]
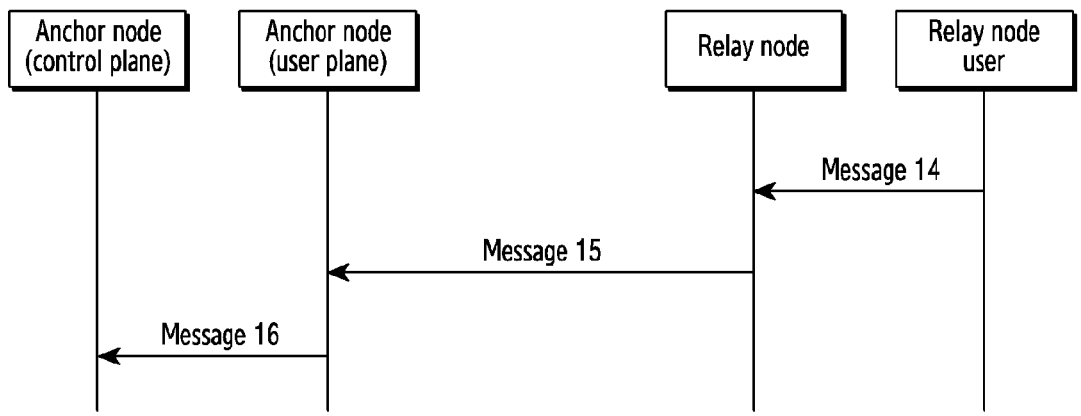

[Fig. 28B]
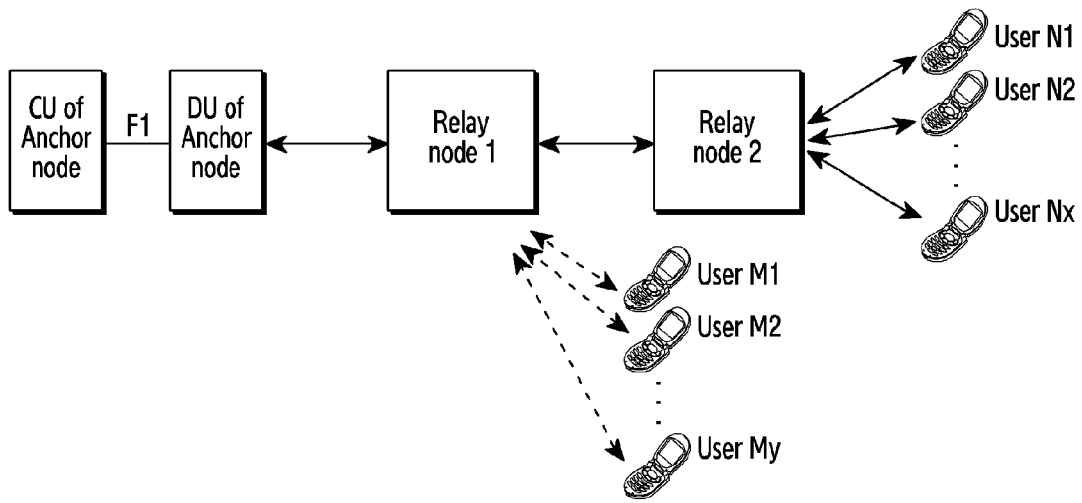
[Fig. 28C]
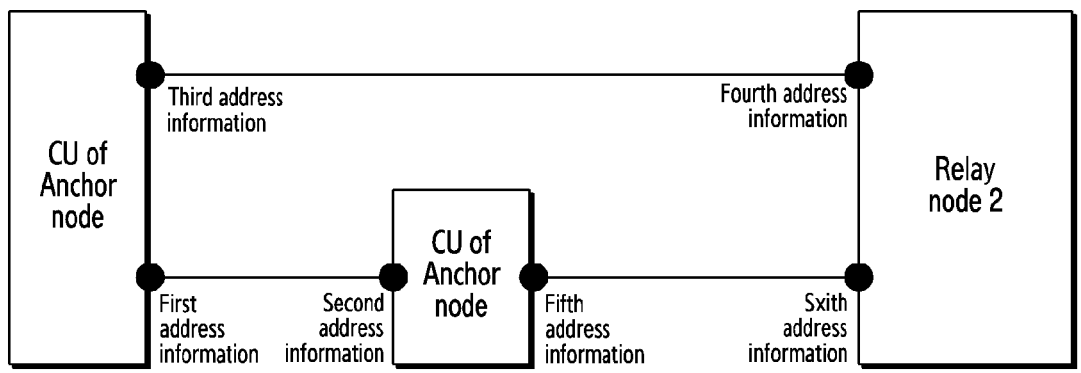
[Fig. 28D]
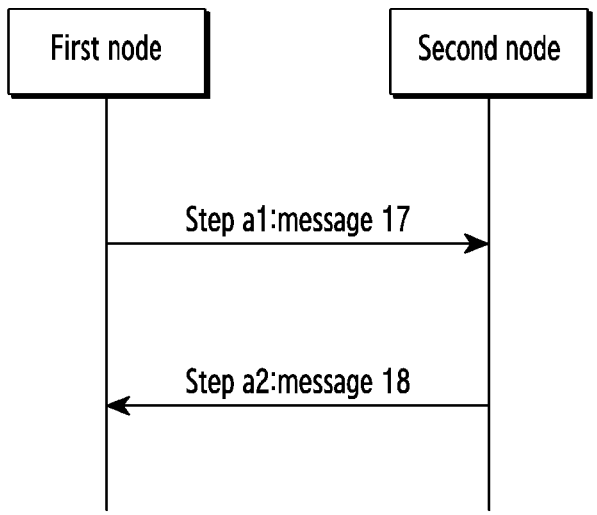

[Fig. 28E]
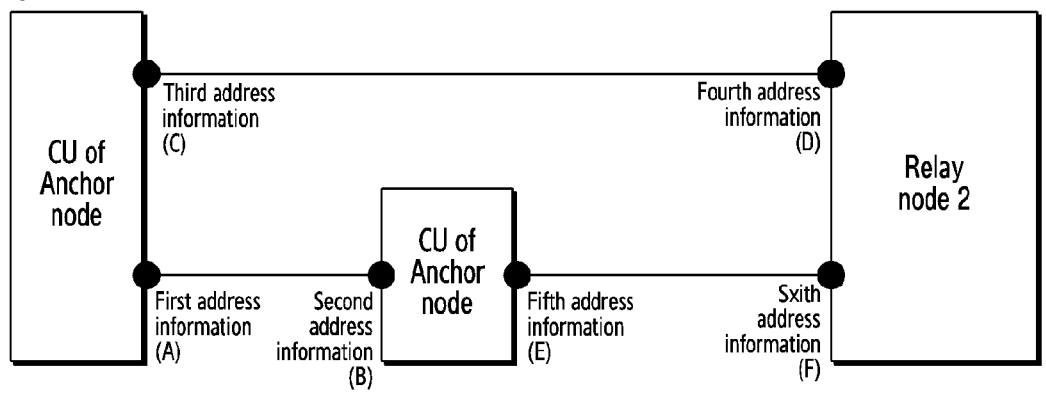
Embodiment 3-1 DL 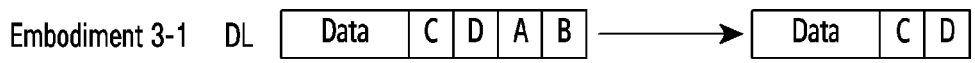
UL 
Embodiment 3-2 DL 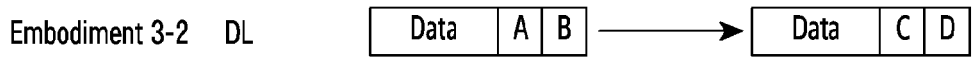
UL 
Embodiment 3-3 DL 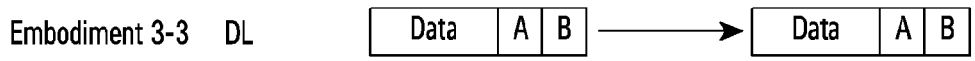
UL 
Embodiment 3-4 DL 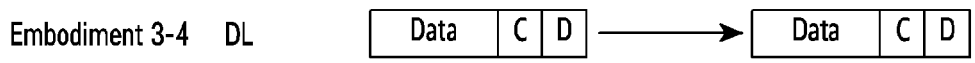
UL 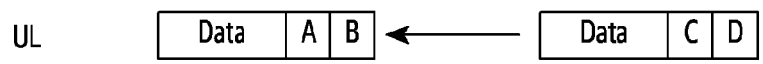
Embodiment 3-5 DL 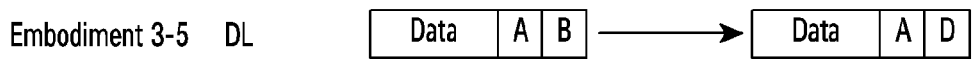
UL 
Embodiment 3-6 DL 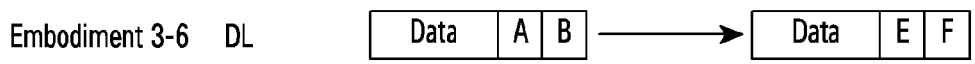
UL 

[Fig. 29]
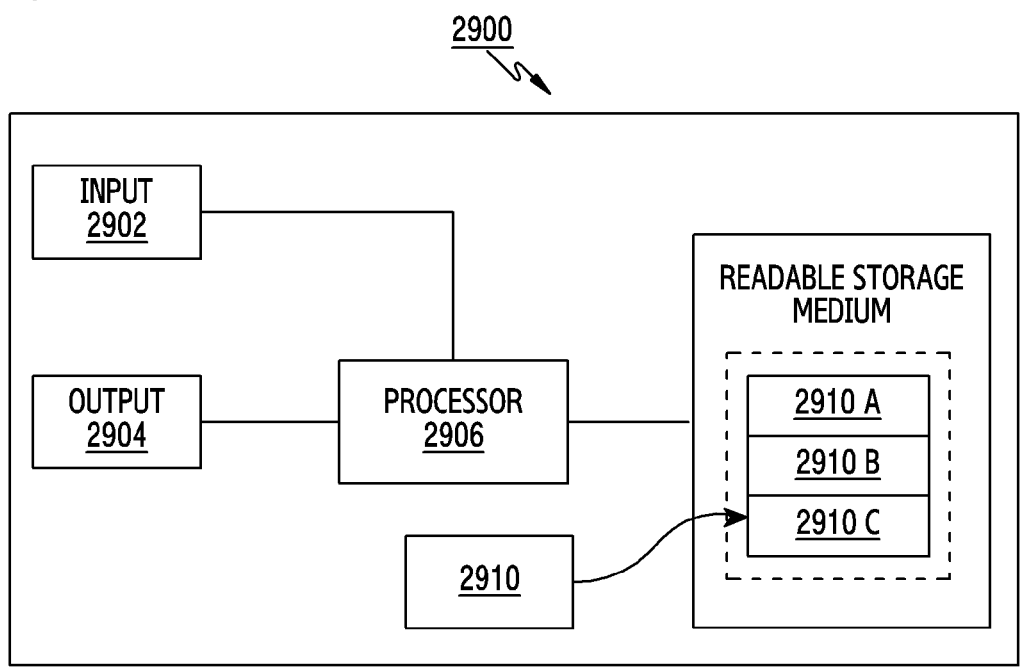

METHOD AND APPARATUS FOR CONFIGURING A RELAY NODE

CROSS-REFERENCE TO RELATED APPLICATIONS

This application is a 371 of International Application No. PCT/KR2019/003985 filed on Apr. 4, 2019, which claims priority to Chinese Patent Application No. 201810305260.8 filed on Apr. 4, 2018 and Chinese Patent Application No. 201910116790.2 filed on Feb. 14, 2019, the disclosures of which are herein incorporated by reference in their entirety.

BACKGROUND

1. Field

The disclosure relates to wireless communication technologies, and more particularly to a method and apparatus for configuring a relay node.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FOAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a NR (New Radio Access) network or a fifth-generation (5G) network, in order to extend a coverage of a network, a subject of IAB (Integrated Access and Backhaul) is proposed. A main purpose of this subject is to construct a multi-hop network architecture.

The disclosure is to provide a method and apparatus for configuring a relay node which realizes configuration of a radio bearer for data transmission in a multi-hop network.

SUMMARY

According to various embodiments of the disclosure, a method for configuring a relay node is provided, wherein the first node transmits to a second node a message that carries information on a radio bearer for a user accessing the second node.

According to various embodiments of the disclosure, a method for configuring a relay node comprises: receiving, by a second node, a message that is transmitted by a first node and carries information on a radio bearer for a user accessing the second node.

According to various embodiments of the disclosure, a method for configuring a node comprises: receiving, by a third node, a message that is transmitted by a first node and carries information on a radio bearer for the third node.

According to various embodiments of the disclosure a method for configuring a node comprises: transmitting, by a first node, to a third node a message that carries information on a radio bearer for the third node.

According to various embodiments of the disclosure, a method for forwarding control signaling, comprises: receiving or transmitting, by a user plane portion of a first node, control signaling from or to a control plane portion of the first node via a control plane message; or receiving or transmitting, by the user plane portion of the first node, control signaling from or to a second node via a user plane message.

According to various embodiments of the disclosure, a method for forwarding control signaling, comprises: receiving or transmitting, by a control plane portion of a first node, control signaling from or to a user plane portion of the first node via a control plane message.

According to various embodiments of the disclosure, a method for forwarding control signaling, comprises: transmitting, by a second node, control signaling to a first node via a control plane message, wherein the control signaling is received over a data radio bearer or a data radio bearer for sending the control signaling; or transmitting, by a second node, control signaling to a third node over a data radio bearer or a data radio bearer for sending the control signaling, wherein the control signaling is received via a control plane message.

According to various embodiments of the disclosure, a method for forwarding control signaling, comprises: receiving, by a first node, control signaling transmitted by a second node via a control plane message, wherein the control signaling is received by the second node over a data radio bearer or a data radio bearer for sending the control signaling.

According to various embodiments of the disclosure, a first node, comprises:
a processor;
a memory storing instructions which, when executed by the processor, cause the processor to perform an above-mentioned method of the first node.

According to various embodiments of the disclosure, a second node comprises:
a processor;
a memory storing instructions which, when executed by the processor, cause the processor to perform an above-mentioned method of the second node.

According to various embodiments of the disclosure, a third node comprises:
a processor;
a memory storing instructions which, when executed by the processor, cause the processor to perform an above-mentioned method of the third node.

According to various embodiments of the disclosure, the first node (device) may be an anchor/donor node, the second node (device) may be a relay node, and the third node (device) may be a relay node user.

According to various embodiments of the disclosure, a computer readable storage medium stores instructions which, when executed by a processor, cause the processor to perform any of the methods described above.

With the method and apparatus of the disclosure, configuration of a radio bearer for data transmission and/or transmission of control signaling in a multi-hop network are realized.

BRIEF DESCRIPTION OF THE DRAWINGS

The above-mentioned features and advantages of the disclosure will become more apparent by reference to the following detailed description when considered in conjunction with the accompanying drawings wherein:

FIG. 1 illustrates a wireless communication system according to various embodiments of the present disclosure;

FIG. 2 illustrates the BS in the wireless communication system according to various embodiments of the present disclosure;

FIG. 3 illustrates the terminal in the wireless communication system according to various embodiments of the present disclosure;

FIG. 4 illustrates the communication interface in the wireless communication system according to various embodiments of the present disclosure;

FIG. 5 shows a schematic architecture of a multi-hop network;

FIG. 6 shows a schematic representation of a CU and a DU of a base station described above;

FIG. 7 shows a schematic representation of a control plane portion and a user plane portion of a CU;

FIG. 8 shows a flow chart of a method for configuring a relay node in accordance with an embodiment of the disclosure;

FIG. 9 shows a flow chart of a method for configuring a relay node in accordance with an embodiment of the disclosure;

FIG. 10 shows a flow chart of a method for configuring a relay node in accordance with an embodiment of the disclosure;

FIG. 11 shows a flow chart of a method for configuring a relay node in accordance with an embodiment of the disclosure;

FIG. 12 shows a flow chart of a method for forwarding control signaling in accordance with an embodiment of the disclosure;

FIG. 13 shows a flow chart of a method for forwarding control signaling in accordance with an embodiment of the disclosure;

FIG. 14 shows a flow chart of a method for forwarding control signaling in accordance with an embodiment of the disclosure;

FIG. 15 shows a flow chart of a method for forwarding control signaling in accordance with an embodiment of the disclosure;

FIG. 16 shows a flow chart of a method for forwarding control signaling in accordance with an embodiment of the disclosure;

FIG. 17 shows a flow chart of a method for forwarding control signaling in accordance with an embodiment of the disclosure;

FIG. 18 is a schematic diagram showing an example of an inter-node radio bearer configuration;

FIG. 19 is a diagram showing an exemplary signaling flow of an inter-node radio bearer configuration in accordance with an embodiment of the disclosure;

FIG. 20 is a diagram showing an exemplary signaling flow of a radio bearer configuration between an anchor/donor node and a relay node (as a distribution unit);

FIG. 21 is a diagram showing an example in which a relay node user aggregates data of multiple aggregated users;

FIG. 22 is a diagram showing a signaling flow of an example of an anchor/donor node configuring a relay node (as a user);

FIG. 23 is a schematic diagram showing an example of an anchor/donor node configuring a relay node (as a user);

FIG. 24 is a schematic diagram showing an example of transmission of control signaling between an anchor/donor node and a relay node user;

FIG. 25 is a diagram showing a signaling flow of an example of an anchor/donor node transmitting control signaling to a relay node;

FIG. 26 is a schematic diagram showing another example of transmission of control signaling between an anchor/donor node and a relay node user;

FIG. 27 is a diagram showing a signaling flow of an example of a relay node transmitting control signaling to an anchor/donor node;

FIG. 28A is a diagram showing a signaling flow of an example of an anchor/donor node transmitting control signaling to a relay node;

FIG. 28B shows an example illustrating nodes involved in transmitting data of a user radio bearer;

FIG. 28C shows an example illustrating address information involved in transmitting data of a user radio bearer;

FIG. 28D shows an example of an interaction process for configuring address information for transmitting data of a user radio bearer;

FIG. 28E shows an example of an embodiment for transmitting data of a user radio bearer; and FIG. 29 is a block diagram showing an exemplary hardware arrangement of an exemplary device in accordance with an embodiment of the disclosure.

DETAILED DESCRIPTION

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

Further, although the present disclosure describes various embodiments based on the terms used in some communication standards (for example, 3rd Generation Partnership Project (3GPP)), they are only examples for the description. Various embodiments of the present disclosure may be easily modified and applied to other communication systems.

Hereinafter, preferred embodiments of the disclosure will be described in detail with reference to the accompanying drawings. Like numbers refer to like elements throughout the various figures. For clarity and conciseness, detailed descriptions of well-known functions and structures incorporated herein are omitted to avoid obscuring the subject matter of the disclosure.

Hereafter, the disclosure will be further described in detail with reference to the accompanying drawings, in order to make the objects, solutions and advantages of the disclosure be more readily understood.

In the following description, the first node (device) may be an anchor/donor node or a centralized unit of an anchor/donor node, the second node (device) may be a distributed unit of an anchor/donor node or a relay node (a relay node to which a relay node user accesses), and the third node (device) may be a relay node user. Of course, other nomenclatures are also possible, and are within the scope of the disclosure.

FIG. 1 illustrates a wireless communication system according to various embodiments of the present disclosure. In FIG. 1, a base station (BS) 110, a terminal 120, and a terminal 130 are illustrated as the part of nodes using a wireless channel in a wireless communication system. FIG. 1 illustrates only one BS, but another BS, which is the same as or similar to the BS 110, may be further included.

The BS 110 is network infrastructure that provides wireless access to the terminals 120 and 130. The BS 110 has coverage defined as a predetermined geographical region based on the distance at which a signal can be transmitted. The BS 110 may be referred to as "access point (AP)," "eNodeB (eNB)," "5th generation (5G) node," "wireless point," "transmission/reception Point (TRP)" as well as "base station."

Each of the terminals 120 and 130 is a device used by a user, and performs communication with the BS 110 through a wireless channel. Depending on the case, at least one of the terminals 120 and 130 may operate without user involvement. That is, at least one of the terminals 120 and 130 is a device that performs machine-type communication (MTC) and may not be carried by the user. Each of the terminals 120 and 130 may be referred to as "user equipment (UE)," "mobile station," "subscriber station," "remote terminal," "wireless terminal," or "user device" as well as "terminal."

The BS 110, the terminal 120, and the terminal 130 may transmit and receive wireless signals in millimeter wave (mmWave) bands (for example, 28 GHz, 30 GHz, 38 GHz, and 60 GHz). At this time, in order to improve a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or a beam management procedure. After that, communications may be performed using resources having a quasi co-located relationship with resources carrying the serving beams 112, 113, 121, and 131.

A first antenna port and a second antenna ports are considered to be quasi co-located if the large-scale properties of the channel over which a symbol on the first antenna port is conveyed can be inferred from the channel over which a symbol on the second antenna port is conveyed. The large-scale properties may include one or more of delay spread, doppler spread, doppler shift, average gain, average delay, and spatial Rx parameters.

FIG. 2 illustrates the BS in the wireless communication system according to various embodiments of the present disclosure. A structure exemplified at FIG. 2 may be understood as a structure of the BS 110, which can be any one of the first node (device), the second node (device), and the third node (device) described below. The term "-module", "-unit" or "-er" used hereinafter may refer to the unit for processing at least one function or operation and may be implemented in hardware, software, or a combination of hardware and software.

Referring to FIG. 2, the BS may include a wireless communication interface 210, a backhaul communication interface 220, a storage unit 230, and a controller 240.

The wireless communication interface 210 performs functions for transmitting and receiving signals through a wireless channel. For example, the wireless communication interface 210 may perform a function of conversion between a baseband signal and bitstreams according to a physical layer standard of the system. For example, in data transmission, the wireless communication interface 210 generates complex symbols by encoding and modulating transmission bitstreams. Further, in data reception, the wireless communication interface 210 reconstructs reception bitstreams by demodulating and decoding the baseband signal.

In addition, the wireless communication interface 210 up-converts the baseband signal into an Radio Frequency (RF) band signal, transmits the converted signal through an antenna, and then down-converts the RF band signal received through the antenna into the baseband signal. To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array consisting of a plurality of antenna elements.

On the hardware side, the wireless communication interface 210 may include a digital unit and an analog unit, and the analog unit may include a plurality of sub-units according to operation power, operation frequency, and the like. The digital unit may be implemented as at least one processor (e.g., a digital signal processor (DSP)).

The wireless communication interface 210 transmits and receives the signal as described above. Accordingly, the wireless communication interface 210 may be referred to as a "transmitter" a "receiver," or a "transceiver." Further, in the following description, transmission and reception performed through the wireless channel may be used to have a meaning including the processing performed by the wireless communication interface 210 as described above.

The backhaul communication interface 220 provides an interface for performing communication with other nodes within the network. That is, the backhaul communication interface 220 converts bitstreams transmitted to another node, for example, another access node, another BS, a higher node, or a core network, from the BS into a physical signal and converts the physical signal received from the other node into the bitstreams.

The storage unit 230 stores a basic program, an application, and data such as setting information for the operation of the BS 110. The storage unit 230 may include a volatile memory, a non-volatile memory, or a combination of volatile memory and non-volatile memory. Further, the storage unit 230 provides stored data in response to a request from the controller 240.

The controller 240 controls the general operation of the BS. For example, the controller 240 transmits and receives a signal through the wireless communication interface 210 or the backhaul communication interface 220. Further, the controller 240 records data in the storage unit 230 and reads the recorded data. The controller 240 may performs functions of a protocol stack that is required from a communication standard. According to another implementation, the protocol stack may be included in the wireless communication interface 210. To this end, the controller 240 may include at least one processor.

According to exemplary embodiments the controller 240 may control the base station to perform operations according to the exemplary embodiments of the present disclosure.

According to various embodiments, a donor node in a wireless communication system comprises at least one processor, and a transceiver operatively coupled to the at least one processor, configured to transmit, to a relay node, a first message comprising first information associated with the donor node regarding a plurality of radio bearers for a terminal accessing the relay node; receive, from the relay node, a second message comprising second information associated with the relay node regarding the plurality of radio bearers for the terminal; and transmit, to the relay node, data for the terminal. The data is transmitted to the terminal through the plurality of radio bearers based on the first information and the second information.

According to various embodiments, a radio bearer among the plurality of radio bearers aggregates multiple radio bearers. The at least one processor is further configured to determine the radio bearer for the terminal accessing the relay node and the multiple radio bearers aggregated by the radio bearer; or determine the radio bearer for the terminal accessing the relay node.

According to various embodiments, the first message comprises one or more of: identification of the terminal accessing the relay node; indication information indicating a type of the terminal accessing the relay node; information on a radio bearer for the terminal accessing the relay node; information on a radio bearer forwarded by the terminal accessing the relay node; information on a tunnel established for the radio bearer between the donor node and the relay node; information on an aggregated multiple radio bearers; information on mapping of a radio bearer; information about an address on a side of the donor node; information about an address on a side of the relay node; indication information corresponding to a radio bearer of the terminal accessing the relay node; indication information indicating the relay node to assign a new address to the radio bearer for the terminal accessing the relay node; a list of address information unavailable for the relay node transmitting data of the radio bearer of the terminal accessing the relay node; and information associated with security configuration.

According to various embodiments, the second message comprises one or more of: identification of the terminal accessing the relay node; information on a radio bearer accepted by the relay node; information on a radio bearer unaccepted by the relay node; information on a radio bearer partly accepted by the relay node; information on mapping of a radio bearer; configuration information of the terminal accessing the relay node that is generated by the relay node; information about an address on a side of the relay node; and information associated with security configuration.

According to various embodiments, the second message further comprises information on an aggregated multiple radio bearers.

According to various embodiments, the donor node comprises a centralized unit of the donor node, and the relay node comprises a distributed unit of the donor node.

According to various embodiments, a relay node in a wireless communication system comprises at least one processor, and a transceiver operatively coupled to the at least one processor, configured to receive, from a donor node, a first message comprising first information associated with the donor node regarding a plurality of radio bearers for a terminal accessing the relay node; transmit, to the donor node, a second message comprising second information associated with the relay node regarding the plurality of radio bearers for the terminal; and receive, from the donor node, data for the terminal. The data is transmitted to the terminal through the plurality of radio bearers based on the first information and the second information.

According to various embodiments, a radio bearer among the plurality of radio bearers aggregates multiple radio bearers. The at least one processor is further configured to determine the radio bearer for the terminal accessing the relay node and the multiple radio bearers aggregated by the radio bearer; or determine the multiple radio bearers aggregated by the radio bearer.

According to various embodiments, the first message comprises one or more of: identification of the terminal accessing the relay node; indication information indicating a type of the terminal accessing the relay node; information on a radio bearer for the terminal accessing the relay node; information on a radio bearer forwarded by the terminal accessing the relay node; information on a tunnel established for the radio bearer between the donor node and the relay node; information on an aggregated multiple radio bearers; information on mapping of a radio bearer; information about an address on a side of the donor node; information about an address on a side of the relay node; indication information corresponding to a radio bearer of the terminal accessing the relay node; indication information indicating the relay node to assign a new address to the radio bearer for the terminal accessing the relay node; a list of address information unavailable for the relay node transmitting data of the radio bearer of the terminal accessing the relay node; and information associated with security configuration.

According to various embodiments, the second message comprises one or more of: identification of the terminal accessing the relay node; information on a radio bearer accepted by the relay node; information on a radio bearer unaccepted by the relay node; information on a radio bearer partly accepted by the relay node; information on mapping of a radio bearer; configuration information of the terminal accessing the relay node that is generated by the relay node; information about an address on a side of the relay node; and information associated with security configuration.

According to various embodiments, the second message further comprises information on an aggregated multiple radio bearers.

According to various embodiments, the donor node comprises a centralized unit of the donor node, and the relay node comprises a distributed unit of the donor node.

FIG. 3 illustrates the terminal in the wireless communication system according to various embodiments of the present disclosure. A structure exemplified at FIG. 3 may be understood as a structure of the terminal 120 or the terminal 130. The term "-module", "-unit" or "-er" used hereinafter may refer to the unit for processing at least one function or operation, and may be implemented in hardware, software, or a combination of hardware and software.

Referring to FIG. 3, the terminal 120 includes a communication interface 310, a storage unit 320, and a controller 330.

The communication interface 310 performs functions for transmitting/receiving a signal through a wireless channel. For example, the communication interface 310 performs a function of conversion between a baseband signal and bitstreams according to the physical layer standard of the system. For example, in data transmission, the communication interface 310 generates complex symbols by encoding and modulating transmission bitstreams. Also, in data reception, the communication interface 310 reconstructs reception bitstreams by demodulating and decoding the baseband signal. In addition, the communication interface 310 up-converts the baseband signal into an RF band signal, transmits the converted signal through an antenna, and then down-converts the RF band signal received through the antenna into the baseband signal. For example, the communication interface 310 may include a transmission filter, a reception filter, an amplifier, a mixer, an oscillator, a DAC, and an ADC.

Further, the communication interface 310 may include a plurality of transmission/reception paths. In addition, the communication interface 310 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 310 may include a plurality of RF chains. The communication interface 310 may perform beamforming.

The communication interface 310 transmits and receives the signal as described above. Accordingly, the communication interface 310 may be referred to as a "transmitter," a "receiver," or a "transceiver." Further, in the following description, transmission and reception performed through the wireless channel is used to have a meaning including the processing performed by the communication interface 310 as described above.

The storage unit 320 stores a basic program, an application, and data such as setting information for the operation of the terminal 120. The storage unit 320 may include a volatile memory, a non-volatile memory, or a combination of volatile memory and non-volatile memory. Further, the storage unit 320 provides stored data in response to a request from the controller 330.

The controller 330 controls the general operation of the terminal 120. For example, the controller 330 transmits and receives a signal through the communication interface 310. Further, the controller 330 records data in the storage unit 320 and reads the recorded data. The controller 330 may performs functions of a protocol stack that is required from a communication standard. According to another implementation, the protocol stack may be included in the communication interface 310. To this end, the controller 330 may include at least one processor or microprocessor, or may play the part of the processor. Further, the part of the communication interface 310 or the controller 330 may be referred to as a communication processor (CP).

According to exemplary embodiments of the present disclosure, the controller 330 may control the terminal to perform operations according to the exemplary embodiments of the present disclosure.

FIG. 4 illustrates the communication interface in the wireless communication system according to various embodiments of the present disclosure. FIG. 4 shows an example for the detailed configuration of the communication interface 210 of FIG. 2 or the communication interface 310 of FIG. 3. More specifically, FIG. 4 shows elements for performing beamforming as part of the communication interface 210 of FIG. 2 or the communication interface 310 of FIG. 3.

Referring to FIG. 4, the communication interface 210 or 310 includes an encoding and circuitry 402, a digital circuitry 404, a plurality of transmission paths 406-1 to 406-N, and an analog circuitry 408.

The encoding and circuitry 402 performs channel encoding. For the channel encoding, at least one of a low-density parity check (LDPC) code, a convolution code, and a polar code may be used. The encoding and circuitry 402 generates modulation symbols by performing constellation mapping.

The digital circuitry 404 performs beamforming for a digital signal (for example, modulation symbols). To this end, the digital circuitry 404 multiples the modulation symbols by beamforming weighted values. The beamforming weighted values may be used for changing the size and phrase of the signal, and may be referred to as a "precoding matrix" or a "precoder." The digital circuitry 404 outputs the digitally beamformed modulation symbols to the plurality of transmission paths 406-1 to 406-N. At this time, according to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert the digitally beamformed digital signals into analog signals. To this end, each of the plurality of transmission paths 406-1 to 406-N may include an inverse fast Fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier: FBMC) is applied. That is, the plurality of transmission paths 406-1 to 406-N provide independent signal processing processes for a plurality of streams generated through the digital beamforming. However, depending on the implementation, some of the elements of the plurality of transmission paths 406-1 to 406-N may be used in common.

The analog circuitry 408 performs beamforming for analog signals. To this end, the digital circuitry 404 multiples the analog signals by beamforming weighted values. The beamformed weighted values are used for changing the size and phrase of the signal. More specifically, according to a connection structure between the plurality of transmission paths 406-1 to 406-N and antennas, the analog circuitry 408 may be configured in various ways. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array, or may be connected to two or more antenna arrays.

FIG. 5 shows a schematic architecture of a multi-hop network. As shown in FIG. 5, a network architecture comprises an anchor/donor node and two relay nodes, wherein all users communicate with the anchor/donor node ultimately. In this architecture, the relay node is responsible for aggregation and disaggregation of user data. If the users N1~Nx and the users M1~My transmit data to the anchor/donor node (Donor Node), the users N1~Nx transmit data via the relay node 1, then, between the relay node 1 and the relay node 2, the data of the users N1~Nx are aggregated into the data sent by the relay node 1 to the relay node 2; and the users M1~My transmit data via the relay node 2, then, between the relay node 2 and the anchor/donor node, the data of the users M1~My and the data from the relay node 1 (i.e., the aggregated data of the users N1~Nx) are aggregated into the data sent by the relay node 2 to the anchor/donor node. If the anchor/donor node transmits data to the users N1~Nx and the users M1~My, the anchor/donor node sends the aggregated data for the users N1~Nx and the users M1~My to the relay node 2. The relay node 2 needs to identify the data for the users N1~Ny and the data for the relay node 1 from the aggregated data, and send them to the users N1~Ny and the relay node 1, respectively. After receiving the data from the relay node 2, the relay node 1 needs to identify respective data for the users M1~My, and send respective data to respective users. In this architecture, the anchor/donor node may be a base station or a centralized unit (CU) of the base station, and the relay node may be a base station or a distributed unit (DU) of the base station. FIG. 6 shows a schematic representation of the CU and DU of the base station described above. As shown in FIG. 6, the CU includes at least a Radio Resource Control (RRC) layer, a Packet Data Convergence Protocol (PDCP) layer and etc., and may also include a Service Data Adaptation Protocol (SDAP) layer. The DU includes a Radio Link Control Protocol (RLC) layer, a Medium Access Control (MAC) layer, and a Physical layer. There is a standardized public interface F1 between the CU and the DU. The F1 interface is divided into a control plane F1-C and a user plane F1-U. F1-C has an IP-based transport network layer. To achieve more reliable signaling, a SCTP protocol is added over IP. The protocol in the application layer is F1AP. SCTP can provide reliable messaging in the application layer. The transport layer of F1-U is UDP/IP, and GTP-U is over UDP/IP and used to carry User Plane Protocol Data Unit (PDU). Further, the CU of the base station can also be divided into a centralized unit control plane portion (CU-CP: CU-control plane) and a centralized unit user plane portion (CU-UP: CU-user plane). FIG. 7 shows a schematic representation of the CU-CP and CU-UP. As shown in FIG. 7, the CU-CP is mainly used to control the DU and the CU-UP, and the CU-UP is mainly used to transmit and receive data of the user plane. The interface between the CU-CP and the CU-UP is E1. The E1 is mainly used to transmit control plane information (i.e. E1AP), which is mainly used to perform control of the CU-UP by the CU-CP.

In the multi-hop network proposed by the IAB, the relay node may be an above-mentioned DU or another base station. The anchor/donor node may be a base station or a above mentioned CU which may be further divided into a CU-CP and a CU-UP.

The above mentioned base station may be a 4G base station such as an eNB, or a 5G base station such as a gNB, or a base station or an access point supporting other radio access technologies.

The prior art does not specify how to configure a radio bearer used for data transmission between a relay node and a node other than the anchor/donor node according to different architectures of a multi-hop network.

FIG. 8 shows a flow chart of a method for configuring a relay node in accordance with an embodiment of the disclosure. The method may be performed at a first node (e.g. an anchor/donor node). In the following description, a user accessing the relay node may also be called as a relay node user. The relay node user may be a user without a relay function or another relay node. The relay node may be directly connected to the anchor/donor node, or may communicate with the anchor/donor node via one or more relay nodes. The anchor/donor node may be a base station or a CU of the base station, and the relay node may be a base station or a DU of the base station.

As shown in FIG. 8, the method comprises an operation S810 in which a first node transmits to a second node a message which carries information on a radio bearer for a user accessing the second node.

When the radio bearer aggregates multiple radio bearers, the method further comprises: determining, by the first node, the radio bearer for the user accessing the second node and the multiple radio bearers aggregated by the radio bearer; or determining, by the first node, the radio bearer for the user accessing the second node.

In some examples, the message transmitted to the relay node described above comprises one or more of:
identification of the user accessing the second node;
indication information indicating a type of the user accessing the second node;
information on a radio bearer for the user accessing the second node;
information on a radio bearer forwarded by the user accessing the second node;
information on a tunnel established for the radio bearer between the first node and the second node;
information on the radio bearers among the aggregated multiple radio bearers; and
information on mapping of a radio bearer.

The method shown in FIG. 8 may further comprise: receiving a response to the message from the second node, wherein the response comprises one or more of:
identification of the user accessing the second node;
information on a radio bearer accepted by the second node;
information on a radio bearer unaccepted by the second node;
information on a radio bearer partly accepted by the second node;
information on mapping of a radio bearer;
configuration information of the user accessing the second node that is generated by the second node.

In some examples, the one or more pieces of information comprised in the response further comprise: information on the radio bearers among the aggregated multiple radio bearers.

FIG. 9 shows a flow chart of a method for configuring a relay node in accordance with an embodiment of the disclosure. The method may be performed at a second node (e.g. a relay node).

As shown in FIG. 9, the method comprises an operation S910, in which a second node receives a message that is transmitted by a first node and carries information on a radio bearer for a user accessing the second node.

When the radio bearer aggregates multiple radio bearers, the method further comprises: determining, by the second node, the radio bearer for the user accessing the second node and the multiple radio bearers aggregated by the radio bearer; or determining, by the second node, the multiple radio bearers aggregated by the radio bearer.

In some examples, the method may further comprise: transmitting a response to the message, wherein the response comprises one or more of:
identification of the user accessing the second node;
information on a radio bearer accepted by the second node;
information on a radio bearer unaccepted by the second node;
information on a radio bearer partly accepted by the second node;
information on mapping of a radio bearer;
configuration information of the user accessing the second node that is generated by the second node.

In some examples, the one or more pieces of information comprised in the response further comprise: information on the radio bearers among the aggregated multiple radio bearers.

FIG. 10 shows a flow chart of a method for configuring a relay node in accordance with an embodiment of the disclosure. The method may be performed at a third node (e.g. a relay node user).

As shown in FIG. 10, the method comprises an operation S1010, in which a third node receives a message that is transmitted by a first node and carries information on a radio bearer for the third node.

The message may comprise one or more of:
identification of the radio bearer;
indication information indicating a type of the radio bearer;
information on a protocol stack corresponding to the radio bearer;
information on the radio bearers aggregated by the radio bear;
information on protocol stacks corresponding to the radio bearers aggregated by the radio bear; and
information on mapping of a radio bearer.

FIG. 11 shows a flow chart of a method for configuring a relay node in accordance with an embodiment of the disclosure. The method may be performed at a first node (e.g. an anchor/donor node).

As shown in FIG. 11, the method comprises an operation S1110, in which a first node transmits to a third node a message carrying the information on a radio bearer for the third node.

The message comprises one or more of:
identification of the radio bearer;
indication information indicating a type of the radio bearer;
information on a protocol stack corresponding to the radio bearer;
information on the radio bearers aggregated by the radio bear;
information on protocol stacks corresponding to the radio bearers aggregated by the radio bear; and
information on mapping of a radio bearer.

FIG. 12 shows a flow chart of a method for forwarding control signaling in accordance with an embodiment of the disclosure. The method may be performed at a first node (e.g. an anchor/donor node).

As shown in FIG. 12, the method comprises an operation S1210, in which a user plane portion of a first node receives or transmits control signaling with a control plane portion of the first node via a control plane message, or the user plane portion of the first node receives or transmits control signaling with a second node via a user plane message.

FIG. 13 shows a flow chart of a method for forwarding control signaling in accordance with an embodiment of the disclosure. The method may be performed at a first node (e.g. an anchor/donor node).

As shown in FIG. 13, the method comprises an operation S1310. The method comprises: receiving or transmitting, by a control plane portion of a first node, control signaling with a user plane portion of the first node via a control plane message.

FIG. 14 shows a flow chart of a method for forwarding control signaling in accordance with an embodiment of the disclosure. The method may be performed at a second node (e.g. a relay node).

As shown in FIG. 14, the method comprises an operation S1410, in which a second node receives or transmits control signaling with a user plane portion of a first node via a user plane message.

FIG. 15 shows a flow chart of a method for forwarding control signaling in accordance with an embodiment of the disclosure. The method may be performed at a second node (e.g. a relay node).

As shown in FIG. 15, the method comprises an operation S1510, in which a second node transmits control signaling to a first node via a control plane message, wherein the control signaling is received over a data radio bearer or a data radio bearer for sending the control signaling; or a second node transmits control signaling to a third node over a data radio bearer or a data radio bearer for sending the control signaling, wherein the control signaling is received via a control plane message.

FIG. 16 shows a flow chart of a method for forwarding control signaling in accordance with an embodiment of the disclosure. The method may be performed at a first node (e.g. an anchor/donor node).

As shown in FIG. 16, the method comprises an operation S1610, in which a first node receives control signaling transmitted by a second node via a control plane message, wherein the control signaling is received by the second node over a data radio bearer or a data radio bearer for sending the control signaling.

FIG. 17 shows a flow chart of a method for forwarding control signaling in accordance with an embodiment of the disclosure. The method may be performed at a third node (e.g. a relay node user).

As shown in FIG. 17, the method comprises an operation S1710, in which a third node receives control signaling transmitted by a second node over a data radio bearer or a data radio bearer for sending the control signaling, wherein the control signaling is received by the second node via a control plane message.

The foregoing methods may be implemented in any manner known to those skilled in the art, such as, but not limited to, by using modules or by using a processor plus a memory, and the like, which are not described in further details herein.

A radio bearer (RB) for a user in an embodiment of the disclosure may be a data radio bearer (DRB) or a signaling radio bearer (SRB), which represents data for a user. Each user may have multiple radio bearers. If the data on all radio bearers for a user is transmitted to the user by a node 1 via a node 2, then relevant configuration of the radio bearers for the user is required between the node 1 and the node 2. Thus, it needs to exchange information on the radio bearers for the user between the node 1 and the node 2, the information comprising at least one or more of:
identification of a radio bearer, such as DRB ID, SRB ID
identification of the user served by the radio bearer
QoS related parameters of the radio bearer, which may comprise one or more of:
QoS parameters at a radio bearer level
QoS parameters of at least one QoS flow comprised in the radio bearer (if the data of one radio bearer is composed of data of at least one QoS flow, the QoS related parameters of the radio bearer will comprise QoS parameters of each of the QoS flows constituting the radio bearer.)
information on a tunnel for the radio bearer. The tunnel is used to transmit data of the radio bearer between two nodes. The information on the tunnel for the radio bearer is address information of the tunnel on one node side, such as GTP Tunnel Endpoint information (e.g. gNB-CU GTP Tunnel Endpoint) (including a transport layer address and a GTP TEID).

FIG. 18 is a schematic diagram showing an example of an inter-node radio bearer configuration. In the example shown in FIG. 18, a user has three radio bearers, i.e. radio bearer 1, radio bearer 2, and radio bearer 3. The three radio bearers need to be transmitted between the node 1 and the node 2, and then between the node 2 and the user (that is, the data to be received by the user is transmitted by the node 1 to the node 2, and then transmitted by the node 2 to the user). In order to transmit user data between the node 1 and the node 2, three tunnels are established, i.e. tunnel 1, tunnel 2 and the tunnel 3, which are respectively used to transmit data of the radio bearer 1, radio bearer 2 and radio bearer 3 for the user. Address 1_1 and address 1_2 shown in the figure are the address information of the tunnel 1 at the node 1 and the node 2, respectively. Address 2_1 and address 2_2 are the address information of the tunnel 2 at the node 1 and the node 2 respectively. Address 3_1 and address 3_2 are the address information of the tunnel 3 at the node 1 and the node 2 respectively.

In order to transmit data among the node 1, the node 2 and the user, a signaling flow as shown in FIG. 19 may be performed. FIG. 19 is a diagram showing an exemplary signaling flow of an inter-node radio bearer configuration in accordance with an embodiment of the disclosure. As shown in FIG. 15, it comprises the following steps.

Step 1: The node 1 transmits a message 1 to the node 2, which comprises at least one of:
  identification of a radio bearer. In the example of FIG. 14, it comprises radio bearers 1&2&3.
  identification of the user served by the radio bearer.
  QoS related parameters of the radio bearer, see above.
  information on a tunnel for the radio bearer. That is, address information of individual radio bearers for the user on the node 1 side. In the example of FIG. 18, it comprises address 1_1, address 2_1, and address 3_1.

Step 2: The node 2 transmits a message 2 to the node 1, which comprises at least one of:
  identification of a radio bearer. In the example of FIG. 14, it comprises radio bearers 1&2&3.
  identification of the user served by the radio bearer.
  information on a tunnel for the radio bearer. That is, address information of individual radio bearers for the user on the node 2 side. In the example of FIG. 18, it comprises address 1_2, address 2_2, and address 3_2.
  configuration information performed by the node 2 to support data transmission with the user (such as the RLC layer configuration for each radio bearer for the user, the logical channel configuration, the information of the MAC layer configuration and the PHY layer configuration for the user, and etc., see TS38.331 or TS36.331).

Step 3: The node 1 transmits a message 3 to the user. The message 3 is transmitted to the user via the node 2, and comprises the configuration information of the user (such as the SDAP/PDCP/RLC layer configuration for each radio bearer for the user, the logical channel configuration, the information of the MAC layer configuration and the PHY layer configuration for the user, e.g. see the messages in TS36.331 or TS38.331).

The radio bearer for the user in the above three steps may be a radio bearer newly added for the user, or may be a modified radio bearer that has been configured for the user.

In the foregoing description, in an embodiment, the node 1 and the node 2 are two base stations (such as two LTE base stations, or one LTE base station and one NR (New radio) base station). In another embodiment, the node 1 may be a CU of a base station, and the node 2 may be a DU of the base station.

In the disclosure, the names of nodes/messages/radio bearers and the like are merely for illustration and other nomenclatures are also possible.

According to the above process of configuring the radio bearer, in order to ensure aggregation and dis-aggregation of user data between the relay nodes, the relay nodes need to be configured accordingly. In the disclosure, it is assumed that an anchor/donor node communicates with a user through a relay node. The anchor/donor node needs to configure the relay node. The anchor/donor node may be a base station or a CU of a base station. The relay node may be a base station or a DU of a base station. The anchor/donor node and the relay node may be directly connected to each other, or the anchor/donor node and the relay node may be connected via another relay node. There are two ways for the anchor/donor node to configure the relay node:

Form 1: The anchor/donor node configures the relay node as a DU or a base station connected to the anchor/donor node. On one hand, the relay node may be accessed by multiple users, and these users each may be a relay node or a normal user (i.e., a user without a relay function). In the disclosure, a user accessing a relay node is called as a relay node user. On the other hand, the relay node may communicate with the anchor/donor node, either through a directly connected link (e.g. a wired or wireless link) or via one or more relay nodes. The process of configuring the relay node by the anchor/donor node is shown in FIG. 20. FIG. 20 is a diagram showing an exemplary signaling flow of a radio bearer configuration between an anchor/donor node and a relay node (as a DU).

Embodiment 1: The anchor/donor node determines a radio bearer for a relay node user, which is configured between the anchor/donor node and the relay node. If the radio bearer aggregates radio bearers for multiple users, the anchor/donor node also determines which radio bearers for which users are aggregated in the radio bearer.

Step 1: The anchor/donor node transmits a message 4 to the relay node. For a user accessing the relay node (i.e. a relay node user), the message 4 comprises at least one of the following information (it should be noted that, if there are multiple relay node users accessing the relay node, then the message 4 comprises at least one of the following information for each relay node user):

➔ identification of the relay node user, such as the user's C-RNTI, the user's identification at the F1 interface (e.g. gNB-CU UE F1AP ID, and/or gNB-DU UE F1AP ID), the user's identification at the Xn/X2 interface, and the gNB-DU ID of the user as a DU, the identification of the user as a relay node, and etc.

➔ indication information indicating a type of the relay node user, such as indication information indicating whether the user is a relay node. The indication information may be an implicit indication, e.g. obtained from the user's identification, or may be an explicit indication.

➔ information on a radio bearer for the relay node user. (The radio bearer may comprise one or more newly established radio bearers or may comprise one or more radio bearers that have been established but need to be modified) the radio bearer needs to be forwarded by the relay node. For one radio bearer of the relay node user, the information comprises at least one of the following information:

identification of the radio bearer indication information indicating a type of the radio bearer. The indication information is used to indicate whether the data of the radio bearer is data of a data radio bearer (DRB) or data of a signaling radio bearer (SRB). For the data of the SRB, optionally, the indication information also indicates a type of the SRB, such as SRB0, SRB1, SRB1s, SRB2, SRB2s, SRB3, etc. The indication information may be implicit or explicit. In an embodiment, a type of a radio bearer is implicitly indicated by a name or identification information of the radio bearer. For example, one or more special DRBs may be defined to indicate that the data of the data radio bearers come from all types of SRBs or one type of SRB, and then the names or identification information of the DRBs implicitly indicate that the data of the data radio bearers comes from all types of SRBs or one type of SRB.

identification of the user to which the radio bearer belongs. The user may be a source (sender) or a destination (receiver) of the data of the radio bearer, or may be a forwarder of the data of the radio bearer.

QoS information of the radio bearer. This information may comprises at least one of the following information:

QoS parameters at a radio bearer level

QoS parameters of at least one QoS flow comprised in the radio bearer. As an embodiment, see the QoS parameters of the QoS flow defined in TS38.423.

information on a tunnel established for the radio bearer between the anchor/donor node and the relay node, such as address information of the tunnel on the anchor/donor node side, e.g. GTP Tunnel Endpoint information (including a transport layer address and a GTP TEID). In an embodiment, if one tunnel is established for the radio bearer, the information on the tunnel includes address information of the tunnel on the anchor/donor node side. In an embodiment, if two tunnels are established for the radio bearer, the information on the tunnel includes address information of the tunnels on the anchor/donor node side. It should be noted that the one or two established tunnels are both used for transmitting and receiving data belonging to the radio bearer.

If the radio bearer (e.g., one radio bearer for the relay node user) aggregates multiple radio bearers (These radio bearers may belong to a same user or may belong to different users. These users are called as aggregated users in the disclosure. The data of the aggregated users are sent to the relay node via the relay node user. For example, the aggregated users may be directly connected to the relay node user, or the aggregated users may be connected to the relay node user via other nodes), it may also comprise information on the aggregated radio bearers, details of which will be described below.

The information on the radio bearer of the relay node user indicates that the anchor/donor node has determined the radio bearer for the relay node user which is configured between it and the relay node. If the radio bearer further aggregates the radio bearers for the aggregated users, the anchor/donor node also determines which radio bearers for which aggregated users are aggregated in the radio bearer.

→ information on mapping of the radio bearer. The information is used to map the data packets on each radio bearer received by the relay node to the radio bearer sent by the relay node. The information is determined by the anchor/donor node, which will be described below in detail.

Step 2: The relay node transmits a message 5 to the anchor/donor node. For a user accessing the relay node (i.e. a relay node user), the message 5 comprises at least one of the following information (it should be noted that, if there are multiple relay node users accessing the relay node, then the message 5 comprises at least one of the following information for each relay node user):

→ identification of the relay node user, such as the user's C-RNTI, the user's identification at the F1 interface (e.g. gNB-CU UE F1AP ID, and/or gNB-DU UE F1AP ID), the user's identification at the Xn/X2 interface, and the gNB-DU ID of the user as a DU, the identification of the user as a relay node, and etc.

→ information on a newly added or modified radio bearer that is accepted (i.e. the relay node can meet the resource requirement of the newly added radio bearer, or the relay node can meet the resource requirement of the modified radio bearer). For a radio bearer, the information comprises at least one of:

identification of the radio bearer;

indication information indicating a type of the radio bearer. The indication information is used to indicate whether the data of the radio bearer is data of a data radio bearer (DRB) or data of a signaling radio bearer (SRB). For the data of the SRB, optionally, the indication information also indicates a type of the SRB, such as SRB0, SRB1, SRB1s, SRB2, SRB2s, SRB3, etc. The indication information may be implicit or explicit. In an embodiment, a type of a radio bearer is implicitly indicated by a name or identification information of the radio bearer. For example, one or more special DRBs may be defined to indicate that the data of the data radio bearers come from all types of SRBs or one type of SRB, and then the names or identification information of the DRBs implicitly indicate that the data of the data radio bearers comes from all types of SRBs or one type of SRB.

identification of the user to which the radio bearer belongs. The user may be a source (sender) or a destination (receiver) of the data of the radio bearer, or may be a forwarder of the data of the radio bearer.

QoS information of the radio bearer which is determined by the relay node, such as QoS parameters at a radio bearer level, QoS parameters of at least one QoS flow comprised in the radio bearer and etc.

information on a tunnel established for the radio bearer between the anchor/donor node and the relay node, such as address information of the tunnel on the relay node side, e.g. GTP Tunnel Endpoint information (eNB-CU GTP Tunnel Endpoint)(including a transport layer address and a GTP TEID). In an embodiment, if one tunnel is established for the radio bearer, the information on the tunnel includes address information of the tunnel on the relay node side. In an embodiment, if two tunnels are established for the radio bearer, the information on the tunnel includes address information of the tunnels on the relay node side. It should be noted that the one or two established tunnels are both used for transmitting and receiving data belonging to the radio bearer.

If the radio bearer (e.g., one radio bearer for the relay node user) aggregates multiple radio bearers (These radio bearers may belong to a same user or may belong to different users. These users are called as aggregated users in the disclosure. The data of the aggregated users are sent to the relay node via the relay node user. For example, the aggregated users may be directly connected to the relay node user, or the aggregated users may be connected to the relay node user via other nodes), indicating the radio bearers of these users have been accepted by the relay node, it may also comprise information on the aggregated radio bearers that are accepted, details of which will be described below.

→ information on a newly added or modified radio bearer that is unaccepted (i.e. the relay node does not meet the resource requirement of the newly added radio bearer, or the relay node does not meet the resource requirement of the modified radio bearer). For a radio bearer, the information comprises at least one of:

identification of the radio bearer;

indication information indicating a type of the radio bearer. The indication information is used to indicate whether the data of the radio bearer is data of a data radio bearer (DRB) or data of a signaling radio bearer (SRB). For the data of the SRB, optionally, the indication information also indicates a type of the SRB, such as SRB0, SRB1, SRB1s, SRB2, SRB2s, SRB3, etc. The indication information may be implicit or explicit. In an embodiment, a type of a radio bearer is implicitly indicated by a name or identification information of the radio bearer. For example, one or more special DRBs may be defined to indicate that the data of the data radio bearers come from all types of SRBs or one type of SRB, and then the names or identification information of the DRBs implicitly indicate that the data of the data radio bearers comes from all types of SRBs or one type of SRB.

identification of the user to which the radio bearer belongs. The user may be a source (sender) or a destination (receiver) of the data of the radio bearer, or may be a forwarder of the data of the radio bearer.

QoS information of the radio bearer which is suggested by the relay node, such as QoS parameters at a radio bearer level, QoS parameters of at least one QoS flow comprised in the radio bearer, and etc.

information on unaccepted reasons, such as heavy load, poor channel condition and etc.

If the radio bearer (e.g., one radio bearer for the relay node user) aggregates multiple radio bearers (These radio bearers may belong to a same user or may belong to different users. These users are called as aggregated users in the disclosure. The data of the aggregated users are sent to the relay node via the relay node user. For example, the aggregated users may be directly connected to the relay node user, or the aggregated users may be connected to the relay node user via other nodes), indicating the radio bearers of these users are not been accepted by the relay node, it may also comprise information on the aggregated radio bearers that are unaccepted, details of which will be described below.

→ information on a newly added or modified radio bearer that is partly accepted (i.e. the relay node can only meet the resource requirement of part of the radio bearers aggregated by the newly added radio bearer, or the relay node can only meet the resource requirement of part of the radio bearers aggregated by the modified radio bearer). For a radio bearer, the information comprises at least one of:

identification of the radio bearer;

indication information indicating a type of the radio bearer. The indication information is used to indicate whether the data of the radio bearer is data of a data radio bearer (DRB) or data of a signaling radio bearer (SRB). For the data of the SRB, optionally, the indication information also indicates a type of the SRB, such as SRB0, SRB1, SRB1s, SRB2, SRB2s, SRB3, etc. The indication information may be implicit or explicit. In an embodiment, a type of a radio bearer is implicitly indicated by a name or identification information of the radio bearer. For example, one or more special DRBs may be defined to indicate that the data of the data radio bearers come from all types of SRBs or one type of SRB, and then the names or identification information of the DRBs implicitly indicate that the data of the data radio bearers comes from all types of SRBs or one type of SRB.

identification of the user to which the radio bearer belongs. The user may be a source (sender) or a destination (receiver) of the data of the radio bearer, or may be a forwarder of the data of the radio bearer.

QoS information of the radio bearer which is determined by the relay node, such as QoS parameters at a radio bearer level, QoS parameters of at least one QoS flow comprised in the radio bearer and etc.

information on a tunnel established for the radio bearer between the anchor/donor node and the relay node, such as address information of the tunnel on the relay node side, e.g. GTP Tunnel Endpoint information (eNB-CU GTP Tunnel Endpoint)(including a transport layer address and a GTP TEID). In an embodiment, if one tunnel is established for the radio bearer, the information on the tunnel includes address information of the tunnel on the relay node side. In an embodiment, if two tunnels are established for the radio bearer, the information on the tunnel includes address information of the tunnels on the relay node side. It should be noted that the one or two established tunnels are both used for transmitting and receiving data belonging to the radio bearer.

If the radio bearer (e.g., one radio bearer for the relay node user) aggregates multiple radio bearers (These radio bearers may belong to a same user or may belong to different users. These users are called as aggregated users in the disclosure. The data of the aggregated users are sent to the relay node via the relay node user. For example, the aggregated users may be directly connected to the relay node user, or the aggregated users may be connected to the relay node user via other nodes), and part of the radio bearer has been accepted by the relay node, it may also provide at least one of:

information on the aggregated radio bearers that are accepted, details of which will be described below.

information on the aggregated radio bearers that are unaccepted, details of which will be described below.

→ information on mapping of a radio bearer. The information is used to map the data packets on each radio bearer received by the relay node to the radio bearer sent by the relay node. The information is given for the radio bearer and/or the aggregated radio bearers of the relay node that have been accepted by the relay node. See the description below for details.

→ configuration information for the user accessing the relay node that is generated by the relay node (such as the RLC layer configuration for each radio bearer for the user, the logical channel configuration, the information of the MAC layer configuration and the PHY layer configuration for the user, and etc., see TS38.331 or TS36.331). The configuration information can help the anchor/donor node generate configuration information of the relay node user.

Embodiment 2: The relay node determines a radio bearer for a relay node user, which is configured between the relay node and the anchor/donor node. If the radio bearer aggregates radio bearers for multiple users, the relay node also determines the radio bearers for the aggregated users that aggregated in the radio bearer.

Step 1: The anchor/donor node transmits a message 4 to the relay node. For a user accessing the relay node (i.e. a relay node user), the message 4 comprises at least one of the following information (it should be noted that, if there are multiple relay node users accessing the relay node, then the message 4 comprises at least one of the following information for each relay node user:

→ identification of the relay node user, such as the user's C-RNTI, the user's identification at the F1 interface (e.g. gNB-CU UE F1AP ID, and/or gNB-DU UE F1AP ID), the user's identification at the Xn/X2 interface, and the gNB-DU ID of the user as a DU, the identification of the user as a relay node, and etc.

→ indication information indicating a type of the relay node user, such as indication information indicating whether the user is a relay node user. The indication information may be an implicit indication, e.g. obtained from the user's identification, or may be an explicit indication.

→ information on a radio bearer forwarded by the relay node. (The radio bearer may comprise one or more newly established radio bearers or may comprise one or more radio bearers that have been established but need to be modified) The radio bearer may belong to the relay node user, or may belong to another user and need to be forwarded by the relay node user. For one such radio bearer, the information comprises at least one of the following information:

identification of the radio bearer indication information indicating a type of the radio bearer. The indication information is used to indicate whether the data of the radio bearer is data of a data radio bearer (DRB) or data of a signaling radio bearer (SRB). For the data of the SRB, optionally, the indication information also indicates a type of the SRB, such as SRB0, SRB1, SRB1s, SRB2, SRB2s, SRB3, etc. The indication information may be implicit or explicit. In an embodiment, a type of a radio bearer is implicitly indicated by a name or identification information of the radio bearer. For example, one or more special DRBs may be defined to indicate that the data of the data radio bearers come from all types of SRBs or one type of SRB, and then the names or identification information of the DRBs implicitly indicate that the data of the data radio bearers comes from all types of SRBs or one type of SRB.

identification of the user to which the radio bearer belongs. The user may be a source (sender) or a destination (receiver) of the data of the radio bearer, or may be a forwarder of the data of the radio bearer.

QoS information of the radio bearer. This information may comprises at least one of the following information:

QoS parameters at a radio bearer level

QoS parameters of at least one QoS flow comprised in the radio bearer. As an embodiment, see the QoS parameters of the QoS flow defined in TS38.423.

information on a tunnel established for the radio bearer between the anchor/donor node and the relay node, address information of the tunnel on the anchor/donor node side, e.g. such as GTP Tunnel Endpoint information (including a transport layer address and a GTP TEID). In an embodiment, if one tunnel is established for the radio bearer, the information on the tunnel includes address information of the tunnel on the anchor/donor node side. In an embodiment, if two tunnels are established for the radio bearer, the information on the tunnel includes address information of the tunnels on the anchor/donor node side. It should be noted that the one or two established tunnels are both used for transmitting and receiving data belonging to the radio bearer.

→ information on mapping of the radio bearer. The information is used to map the data packets on each radio bearer received by the relay node to the radio bearer sent by the relay node. The information is given by the anchor/donor node, which will be described below in detail.

Step 2: The relay node transmits a message 5 to the anchor/donor node. For a user accessing the relay node (i.e. a relay node user), the message 5 comprises at least one of the following information (it should be noted that, if there are multiple relay node users accessing the relay node, then the message 5 comprises at least one of the following information for each relay node user:

→ identification of the relay node user, such as the user's C-RNTI, the user's identification at the F1 interface (e.g. gNB-CU UE F1AP ID, and/or gNB-DU UE F1AP ID), the user's identification at the Xn/X2 interface, and the gNB-DU ID of the user as a DU, the identification of the user as a relay node, and etc.

→ information on a newly added or modified radio bearer that is accepted (i.e. the relay node can meet the resource requirement of the newly added radio bearer, or the relay node can meet the resource requirement of the modified radio bearer). The radio bearer is for one relay node user. For one radio bearer for one relay node user, the information comprises at least one of:

identification of the radio bearer;

indication information indicating a type of the radio bearer. The indication information is used to indicate whether the data of the radio bearer is data of a data radio bearer (DRB) or data of a signaling radio bearer (SRB). For the data of the SRB, optionally, the indication information also indicates a type of the SRB, such as SRB0, SRB1, SRB1s, SRB2, SRB2s, SRB3, etc. The indication information may be implicit or explicit. In an embodiment, a type of a radio bearer is implicitly indicated by a name or identification information of the radio bearer. For example, one or more special DRBs may be defined to indicate that the data of the data radio bearers come from all types of SRBs or one type of SRB, and then the names or identification information of the DRBs implicitly indicate that the data of the data radio bearers comes from all types of SRBs or one type of SRB.

identification of the user to which the radio bearer belongs. The user may be a source (sender) or a destination (receiver) of the data of the radio bearer, or may be a forwarder of the data of the radio bearer.

QoS information of the radio bearer which is determined by the relay node, such as QoS parameters at a radio bearer level, QoS parameters of at least one QoS flow comprised in the radio bearer and etc.

information on a tunnel established for the radio bearer between the anchor/donor node and the relay node, such as address information of the tunnel on the relay node side, e.g. GTP Tunnel Endpoint information (eNB-CU GTP Tunnel Endpoint)(including a transport layer address and a GTP TEID). In an embodiment, if one tunnel is established for the radio bearer, the information on the tunnel includes address information of the tunnel on the relay node side. In an embodiment, if two tunnels are established for the radio bearer, the information on the tunnel includes address information of the tunnels on the relay node side. It should be noted that the one or two established tunnels are both used for transmitting and receiving data belonging to the radio bearer.

If the radio bearer (e.g., one radio bearer for the relay node user) aggregates multiple radio bearers (These radio bearers may belong to a same user or may belong to different users. These users are called as aggregated users in the disclosure. The data of the aggregated users are sent to the relay node via the relay node user. For example, the aggregated users may be directly connected to the relay node user, or the aggregated users may be connected to the relay node user via other nodes), it indicates the radio bearers of the aggregated users have been accepted by the relay node, and have been aggregated into the radio bearer. From thereon, it can be seen that it is the relay node that determines how the radio bearers of these aggregated users are aggregated into the radio bearer of the relay node user. Further, it may also comprise information on the aggregated radio bearers that are accepted, details of which will be described below if such information exists.

→ information on a newly added or modified radio bearer that is unaccepted (i.e. the relay node does not meet the resource requirement of the newly added radio bearer, or the relay node does not meet the resource requirement of the modified radio bearer). For a radio bearer, the information comprises at least one of:

identification of the radio bearer;

indication information indicating a type of the radio bearer. The indication information is used to indicate whether the data of the radio bearer is data of a data radio bearer (DRB) or data of a signaling radio bearer (SRB). For the data of the SRB, optionally, the indication information also indicates a type of the SRB, such as SRB0, SRB1, SRB1s, SRB2, SRB2s, SRB3, etc. The indication information may be implicit or explicit. In an embodiment, a type of a radio bearer is implicitly indicated by a name or identification information of the radio bearer. For example, one or more special DRBs may be defined to indicate that the data of the data radio bearers come from all types of SRBs or one type of SRB, and then the names or identification information of the DRBs implicitly indicate that the data of the data radio bearers comes from all types of SRBs or one type of SRB.

identification of the user to which the radio bearer belongs. The user may be a source (sender) or a destination (receiver) of the data of the radio bearer, or may be a forwarder of the data of the radio bearer.

QoS information of the radio bearer which can be suggested by the relay node, such as QoS parameters at a radio bearer level, QoS parameters of at least one QoS flow comprised in the radio bearer, and etc.

information on unaccepted reasons, such as heavy load, poor channel condition and etc.

→ information on mapping of a radio bearer. The information is used to map the data packets on each radio bearer received by the relay node to the radio bearer sent by the relay node. The information is given for the radio bearer and/or the aggregated radio bearers of the relay node that have been accepted by the relay node. This information is determined by the relay node. In an embodiment, this information is determined by the relay node with reference to the information on mapping of the radio bearer that is provided by the anchor/donor node. See the description below for details.

→ configuration information for the user accessing the relay node that is generated by the relay node (such as the RLC layer configuration for each radio bearer for the user, the logical channel configuration, the information of the MAC layer configuration and the PHY layer configuration for the user, and etc., see TS38.331 or TS36.331). The configuration information can help the anchor/donor node generate configuration information of the relay node user.

Embodiment 3: The anchor/donor node determines a radio bearer for a relay node user, which is configured between the anchor/donor node and the relay node. If the radio bearer aggregates radio bearers for multiple users, the relay node determines the radio bearers for the aggregated users that aggregated in the radio bearer.

Step 1: The anchor/donor node transmits a message 4 to the relay node. For a user accessing the relay node (i.e. a relay node user), the message 4 comprises at least one of the following information (it should be noted that, if there are multiple relay node users accessing the relay node, then the message 4 comprises at least one of the following information for each relay node user):

→ identification of the relay node user, such as the user's C-RNTI, the user's identification at the F1 interface (e.g. gNB-CU UE F1AP ID, and/or gNB-DU UE F1AP ID), the user's identification at the Xn/X2 interface, and the gNB-DU ID of the user as a DU, the identification of the user as a relay node, and etc.

→ indication information indicating a type of the relay node user, such as indication information indicating whether the user is a relay node. The indication information may be an implicit indication, e.g. obtained from the user's identification, or may be an explicit indication.

→ information on a radio bearer for the relay node user. (The radio bearer may comprise one or more newly established radio bearers or may comprise one or more radio bearers that have been established but need to be modified) the radio bearer needs to be forwarded by the relay node. For one radio bearer of the relay node user, the information comprises at least one of the following information:

identification of the radio bearer indication information indicating a type of the radio bearer. The indication information is used to indicate whether the data of the radio bearer is data of a data radio bearer (DRB) or data of a signaling radio bearer (SRB). For the data of the SRB, optionally, the indication information also indicates a type of the SRB, such as SRB0, SRB1, SRB1s, SRB2, SRB2s, SRB3, etc. The indication information may be implicit or explicit. In an embodiment, a type of a radio bearer is implicitly indicated by a name or identification information of the radio bearer. For example, one or more special DRBs may be defined to indicate that the data of the data radio bearers come from all types of SRBs or one type of SRB, and then the names or identification information of the DRBs implicitly indicate that the data of the data radio bearers comes from all types of SRBs or one type of SRB.

identification of the user to which the radio bearer belongs. The user may be a source (sender) or a destination (receiver) of the data of the radio bearer, or may be a forwarder of the data of the radio bearer.

QoS information of the radio bearer. This information may comprises at least one of the following information:

QoS parameters at a radio bearer level

QoS parameters of at least one QoS flow comprised in the radio bearer. As an embodiment, see the QoS parameters of the QoS flow defined in TS38.423.

information on a tunnel established for the radio bearer between the anchor/donor node and the relay node, such as address information of the tunnel on the anchor/donor node side, e.g. GTP Tunnel Endpoint information (including a transport layer address and a GTP TEID). In an embodiment, if one tunnel is established for the radio bearer, the information on the tunnel includes address information of the tunnel on the anchor/donor node side. In an embodiment, if two tunnels are established for the radio bearer, the information on the tunnel includes address information of the tunnels on the anchor/donor node side. It should be noted that the one or two established tunnels are both used for transmitting and receiving data belonging to the radio bearer.

→ information on a radio bearer forwarded by the relay node. (The radio bearer may comprise one or more newly established radio bearers or may comprise one or more radio bearers that have been established but need to be modified) The radio bearer may belong to the relay node user, or may belong to another user and need to be forwarded by the relay node user. For one such radio bearer, the information comprises at least one of the following information:

identification of the radio bearer indication information indicating a type of the radio bearer. The indication information is used to indicate whether the data of the radio bearer is data of a data radio bearer (DRB) or data of a signaling radio bearer (SRB). For the data of the SRB, optionally, the indication information also indicates a type of the SRB, such as SRB0, SRB1, SRB1s, SRB2, SRB2s, SRB3, etc. The indication information may be implicit or explicit. In an embodiment, a type of a radio bearer is implicitly indicated by a name or identification information of the radio bearer. For example, one or more special DRBs may be defined to indicate that the data of the data radio bearers come from all types of SRBs or one type of SRB, and then the names or identification information of the DRBs implicitly indicate that the data of the data radio bearers comes from all types of SRBs or one type of SRB.

identification of the user to which the radio bearer belongs. The user may be a source (sender) or a destination (receiver) of the data of the radio bearer, or may be a forwarder of the data of the radio bearer.

QoS information of the radio bearer. This information may comprises at least one of the following information:

QoS parameters at a radio bearer level

QoS parameters of at least one QoS flow comprised in the radio bearer. As an embodiment, see the QoS parameters of the QoS flow defined in TS38.423.

information on a tunnel established for the radio bearer between the anchor/donor node and the relay node, such as address information of the tunnel on the anchor/donor node side, e.g.GTP Tunnel Endpoint information (including a transport layer address and a GTP TEID). In an embodiment, if one tunnel is established for the radio bearer, the information on the tunnel includes address information of the tunnel on the anchor/donor node side. In an embodiment, if two tunnels are established for the radio bearer, the information on the tunnel includes address information of the tunnels on the anchor/donor node side. It should be noted that the one or two established tunnels are both used for transmitting and receiving data belonging to the radio bearer.

The information on the radio bearer of the relay node user indicates that the anchor/donor node has determined the radio bearer for the relay node user which is configured between it and the relay node, but the anchor/donor node does not determine which radio bearers for which aggregated users are aggregated in the radio bearer.

→ information on mapping of the radio bearer. The information is used to map the data packets on each radio bearer received by the relay node to the radio bearer sent by the relay node. The information is determined by the anchor/donor node, which will be described below in detail.

Step 2: The relay node transmits a message 5 to the anchor/donor node. For a user accessing the relay node (i.e. a relay node user), the message 5 comprises at least one of the following information (it should be noted that, if there are multiple relay node users accessing the relay node, then the message 5 comprises at least one of the following information for each relay node user:

→ identification of the relay node user, such as the user's C-RNTI, the user's identification at the F1 interface (e.g. gNB-CU UE F1AP ID, and/or gNB-DU UE F1AP ID), the user's identification at the Xn/X2 interface, and the gNB-DU ID of the user as a DU, the identification of the user as a relay node, and etc.

→ information on a newly added or modified radio bearer that is accepted (i.e. the relay node can meet the resource requirement of the newly added radio bearer, or the relay node can meet the resource requirement of the modified radio bearer). For a radio bearer, the information comprises at least one of:

identification of the radio bearer;

indication information indicating a type of the radio bearer. The indication information is used to indicate whether the data of the radio bearer is data of a data radio bearer (DRB) or data of a signaling radio bearer (SRB). For the data of the SRB, optionally, the indication information also indicates a type of the SRB, such as SRB0, SRB1, SRB1s, SRB2, SRB2s, SRB3, etc. The indication information may be implicit or explicit. In an embodiment, a type of a radio bearer is implicitly indicated by a name or identification information of the radio bearer. For example, one or more special DRBs may be defined to indicate that the data of the data radio bearers come from all types of SRBs or one type of SRB, and then the names or identification information of the DRBs implicitly indicate that the data of the data radio bearers comes from all types of SRBs or one type of SRB.

identification of the user to which the radio bearer belongs. The user may be a source (sender) or a destination (receiver) of the data of the radio bearer, or may be a forwarder of the data of the radio bearer.

QoS information of the radio bearer which is determined by the relay node, such as QoS parameters at a radio bearer level, QoS parameters of at least one QoS flow comprised in the radio bearer etc.

information on a tunnel established for the radio bearer between the anchor/donor node and the relay node, such as address information of the tunnel on the relay node side, e.g. GTP Tunnel Endpoint information (eNB-CU GTP Tunnel Endpoint)(including a transport layer address and a GTP TEID). In an embodiment, if one tunnel is established for the radio bearer, the information on the tunnel includes address information of the tunnel on the relay node side. In an embodiment, if two tunnels are established for the radio bearer, the information on the tunnel includes address information of the tunnels on the relay node side. It should be noted that the one or two established tunnels are both used for transmitting and receiving data belonging to the radio bearer.

If the radio bearer (e.g., one radio bearer for the relay node user) aggregates multiple radio bearers (These radio bearers may belong to a same user or may belong to different users. These users are called as aggregated users in the disclosure. The data of the aggregated users are sent to the relay node via the relay node user. For example, the aggregated users may be directly connected to the relay node user, or the aggregated users may be connected to the relay node user via other nodes), it indicates the radio bearers of the users have been accepted by the relay node, and have been aggregated into the radio bearer. From thereon, it can be seen that it is the relay node that determines how the radio bearers of these aggregated users are aggregated into the radio bearer of the relay node user. Further, it may also comprise information on the aggregated radio bearers that are accepted, details of which will be described below.

→ information on a newly added or modified radio bearer that is unaccepted (i.e. the relay node does not meet the resource requirement of the newly added radio bearer, or the relay node does not meet the resource requirement of the modified radio bearer). For a radio bearer, it may be a radio bearer indicated by the information on the radio bearer for the relay node user in step 1, or may be a radio bearer indicated by the information on the radio bearer forwarded by the relay node in step 1, the information comprises at least one of:

- identification of the radio bearer;
- indication information indicating a type of the radio bearer. The indication information is used to indicate whether the data of the radio bearer is data of a data radio bearer (DRB) or data of a signaling radio bearer (SRB). For the data of the SRB, optionally, the indication information also indicates a type of the SRB, such as SRB0, SRB1, SRB1s, SRB2, SRB2s, SRB3, etc. The indication information may be implicit or explicit. In an embodiment, a type of a radio bearer is implicitly indicated by a name or identification information of the radio bearer. For example, one or more special DRBs may be defined to indicate that the data of the data radio bearers come from all types of SRBs or one type of SRB, and then the names or identification information of the DRBs implicitly indicate that the data of the data radio bearers comes from all types of SRBs or one type of SRB.
- identification of the user to which the radio bearer belongs. The user may be a source (sender) or a destination (receiver) of the data of the radio bearer, or may be a forwarder of the data of the radio bearer.
- identification of the user to which the radio bearer belongs. (The user may be a target recipient or a source (sender) of the data of the radio bearer.)

QoS information of the radio bearer which can be suggested by the relay node, such as QoS parameters at a radio bearer level, QoS parameters of at least one QoS flow comprised in the radio bearer, and etc.

- information on unaccepted reasons, such as heavy load, poor channel condition and etc.

→ information on mapping of a radio bearer. The information is used to map the data packets on each radio bearer received by the relay node to the radio bearer sent by the relay node. The information is given for the radio bearer and/or the aggregated radio bearers of the relay node that have been accepted by the relay node. See the description below for details.

→ configuration information for the user accessing the relay node that is generated by the relay node (such as the RLC layer configuration for each radio bearer for the user, the logical channel configuration, the information of the MAC layer configuration and the PHY layer configuration for the user, and etc., see CellGroupConfig IE in TS38.331). The configuration information can help the source node generate configuration information of the relay node user.

Hereafter, details of the information comprised in the above embodiments and listed below will be described.

1) information on mapping of a radio bearer The information is used to map the data packets on each radio bearer received by the relay node to the radio bearer sent by the relay node. The information on mapping of the radio bearer may be new information, or may be information for modifying already configured information. The information on mapping is related to a mapping approach. Possible mapping approaches are as below:

Mapping depends on information contained in each data packet received. In such a case, the information on mapping comprises at least one of:
- identification information of a sender that sends the data packet to the relay node
- identification information of a radio bearer which is used to send the data packet to the relay node
- information contained in the data packet, such as identification information of the user (the user may be a relay node, or may be a user without a relay function) or the radio bearer to which the data packet belongs, routing identification information of the data packet, identification information on the transmission path of the data packet, and etc.
- identification of a target radio bearer. The target radio bearer is a radio bearer used by the relay node to send the data packets it received. In addition, in order to increase flexibility, the mapping information may also provide multiple target radio bearers, and may optionally further indicate a priority or an order of priority for each target radio bearer.
- identification of a user who is a recipient of the target radio bearer. In addition, in order to increase flexibility, the mapping information may also provide identifications of multiple recipient users, and may optionally further indicate a priority or an order of priority for each recipient user.

Mapping depends on information of a tunnel from which each data packet is received. In such a case, the information on mapping comprises at least one of:
- identification information of a sender that sends the data packet to the relay node
- identification information of a radio bearer which is used to send the data packet to the relay node
- information of a tunnel from which each data packet is received, such as address information of two or one end of the tunnel, or identification information of the user to which the tunnel corresponds and/or radio bearer information of the user (the user may be a relay node user, or may be a user without a relay function).

identification of a target radio bearer. The target radio bearer is a radio bearer used by the relay node to send the data packets it received. In addition, in order to increase flexibility, the mapping information may also provide multiple target radio bearers, and may optionally further indicate a priority or an order of priority for each target radio bearer.

identification of a user who is a recipient of the target radio bearer. In addition, in order to increase flexibility, the mapping information may also provide identifications of multiple recipient users, and may optionally further indicate a priority or an order of priority for each recipient user.

Mapping depends on a radio bearer from which the data packet is received by the relay node (called as a source radio bearer). For each source radio bearer, the information on mapping comprises at least one of:

identification information of a sender that sends the data packet to the relay node identification information of a radio bearer which is used to send the data packet to the relay node identification of a target radio bearer. The target radio bearer is a radio bearer used by the relay node to send the data packets it received. In addition, in order to increase flexibility, the mapping information may also provide multiple target radio bearers, and may optionally further indicate a priority or an order of priority for each target radio bearer.

identification of a user who is a recipient of the target radio bearer. In addition, in order to increase flexibility, the mapping information may also provide identifications of multiple recipient users, and may optionally further indicate a priority or an order of priority for each recipient user.

The above mapping approaches are only examples, and other mapping approaches and related information on mapping are also possible. Further, a relay node may forward uplink data of a user (data sent by a user to a base station/anchor/donor node), and may also forward downlink data of a user (data sent by a base station/anchor/donor node to a user). The above mentioned information on mapping of a radio bearer may be given for the uplink and the downlink respectively, or may be given commonly for both the uplink and the downlink.

2) information on an aggregated radio bearer

This information may be comprised in the message 4 in step 1. This information may be presented in the following two forms:

a. This information is presented for the aggregated users to which the aggregated radio bearers belong. That is, for one aggregated user, this information may comprise at least one of:

identification information of the aggregated user, such as the user's C-RNTI, the user's identification at the F1 interface (e.g. gNB-CU UE F1AP ID, and/or gNB-DU UE F1AP ID), the user's identification at the Xn/X2 interface, and the gNB-DU ID of the user as a DU, the identification of the user as a relay node, and etc.

indication information indicating a type of the aggregated user, such as indication information indicating whether the user is a relay node. The indication information may be an implicit indication, e.g. obtained from the user's identification, or may be an explicit indication.

information on an aggregated radio bearer of the aggregated user. (The radio bearer may comprise one or more newly established radio bearers or may comprise one or more radio bearers that have been established but need to be modified.) For one such radio bearer, the information comprises at least one of the following information:

identification of the radio bearer indication information indicating a type of the radio bearer. The indication information is used to indicate whether the data of the radio bearer is data of a data radio bearer (DRB) or data of a signaling radio bearer (SRB). For the data of the SRB, optionally, the indication information also indicates a type of the SRB, such as SRB0, SRB1, SRB1s, SRB2, SRB2s, SRB3, etc. The indication information may be implicit or explicit. In an embodiment, a type of a radio bearer is implicitly indicated by a name or identification information of the radio bearer. For example, one or more special DRBs may be defined to indicate that the data of the data radio bearers come from all types of SRBs or one type of SRB, and then the names or identification information of the DRBs implicitly indicate that the data of the data radio bearers comes from all types of SRBs or one type of SRB.

identification of the user to which the radio bearer belongs. The user may be a source (sender) or a destination (receiver) of the data of the radio bearer, or may be a forwarder of the data of the radio bearer.

QoS information of the radio bearer, such as QoS parameters at a radio bearer level, and/or QoS parameters of at least one QoS flow comprised in the radio bearer. As an embodiment, see the QoS parameters of the QoS flow defined in TS38.423.

information on a tunnel established for the radio bearer between the anchor/donor node and the relay node, such as address information of the tunnel on the anchor/donor node side, e.g. GTP Tunnel Endpoint information (including a transport layer address and a GTP TEID). In an embodiment, if one tunnel is established for the radio bearer, the information on the tunnel includes address information of the tunnel on the anchor/donor node side. In an embodiment, if two tunnels are established for the radio bearer, the information on the tunnel includes address information of the tunnels on the anchor/donor node side. It should be noted that the one or two established tunnels are both used for transmitting and receiving data belonging to the radio bearer.

b. This information is presented for the aggregated radio bearers. That is, for one aggregated radio bearer (the radio bearer may comprise one or more newly established radio bearers or may comprise one or more radio bearers that have been established but need to be modified), the information comprises at least one of the following information:

identification information of the aggregated user to which the aggregated radio bearer belongs, such as the user's C-RNTI, the user's identification at the F1 interface (e.g. gNB-CU UE F1AP ID, and/or gNB-DU UE F1AP ID), the user's identification at the Xn/X2 interface, and the gNB-DU ID of the user as a DU, the identification of the user as a relay node, and etc.

indication information indicating a type of the aggregated user to which the aggregated radio bearer belongs, such as indication information indicating whether the user is a relay node. The indication information may be an implicit indication, e.g. obtained from the user's identification, or may be an explicit indication.

identification of the radio bearer indication information indicating a type of the radio bearer. The indication information is used to indicate whether the data of the radio bearer is data of a data radio bearer (DRB) or data of a signaling radio bearer (SRB). For the data of the SRB, optionally, the indication information also indicates a type of the SRB, such as SRB0, SRB1, SRB1s, SRB2, SRB2s, SRB3, etc. The indication information may be implicit or explicit. In an embodiment, a type of a radio bearer is implicitly indicated by a name or identification information of the radio bearer. For example, one or more special DRBs may be defined to indicate that the data of the data radio bearers come from all types of SRBs or one type of SRB, and then the names or identification information of the DRBs implicitly indicate that the data of the data radio bearers comes from all types of SRBs or one type of SRB.

identification of the user to which the radio bearer belongs. The user may be a source (sender) or a destination (receiver) of the data of the radio bearer, or may be a forwarder of the data of the radio bearer.

QoS information of the radio bearer, such as QoS parameters at a radio bearer level, and/or QoS parameters of at least one QoS flow comprised in the radio bearer. As an embodiment, see the QoS parameters of the QoS flow defined in TS38.423.

information on a tunnel established for the radio bearer between the anchor/donor node and the relay node, address information of the tunnel on the anchor/donor node side, e.g. such as GTP Tunnel Endpoint information (including a transport layer address and a GTP TEID). In an embodiment, if one tunnel is established for the radio bearer, the information on the tunnel includes address information of the tunnel on the anchor/donor node side. In an embodiment, if two tunnels are established for the radio bearer, the information on the tunnel includes address information of the tunnels on the anchor/donor node side. It should be noted that the one or two established tunnels are both used for transmitting and receiving data belonging to the radio bearer identification of the radio bearer.

3) information on an aggregated radio bearer that is accepted This information may be comprised in the message 5 in step 2. This information may be presented in the following two forms:

a. This information is presented for an aggregated user to which the accepted aggregated radio bearer belongs. For one aggregated user, this information may comprise at least one of:

identification information of the aggregated user, such as the user's C-RNTI, the user's identification at the F1 interface (e.g. gNB-CU UE F1AP ID, and/or gNB-DU UE F1AP ID), the user's identification at the Xn/X2 interface, and the gNB-DU ID of the user as a DU, the identification of the user as a relay node, and etc.

information on an accepted aggregated radio bearer of the aggregated user. (The radio bearer may comprise one or more newly established radio bearers or may comprise one or more radio bearers that have been established but need to be modified.) For one radio bearer of the aggregated user, the information comprises at least one of the following information:

identification of the radio bearer indication information indicating a type of the radio bearer. The indication information is used to indicate whether the data of the radio bearer is data of a data radio bearer (DRB) or data of a signaling radio bearer (SRB). For the data of the SRB, optionally, the indication information also indicates a type of the SRB, such as SRB0, SRB1, SRB1s, SRB2, SRB2s, SRB3, etc. The indication information may be implicit or explicit. In an embodiment, a type of a radio bearer is implicitly indicated by a name or identification information of the radio bearer. For example, one or more special DRBs may be defined to indicate that the data of the data radio bearers come from all types of SRBs or one type of SRB, and then the names or identification information of the DRBs implicitly indicate that the data of the data radio bearers comes from all types of SRBs or one type of SRB.

identification of the user to which the radio bearer belongs. The user may be a source (sender) or a destination (receiver) of the data of the radio bearer, or may be a forwarder of the data of the radio bearer.

QoS information of the radio bearer which is determined by the relay ndoe, such as QoS parameters at a radio bearer level, QoS parameters of at least one QoS flow comprised in the radio bearer. As an embodiment, see the QoS parameters of the QoS flow defined in TS38.423.

information on a tunnel established for the radio bearer between the anchor/donor node and the relay node, address information of the tunnel on the relay node side, e.g. such as GTP Tunnel Endpoint information (including a transport layer address and a GTP TEID). In an embodiment, if one tunnel is established for the radio bearer, the information on the tunnel includes address information of the tunnel on the relay node side. In an embodiment, if two tunnels are established for the radio bearer, the information on the tunnel includes address information of the tunnels on the relay node side. It should be noted that the one or two established tunnels are both used for transmitting and receiving data belonging to the radio bearer.

b. This information is presented for the accepted aggregated radio bearers. For one such radio bearer, the information comprises at least one of the following information:

identification information of the aggregated user to which the radio bearer belongs, such as the user's C-RNTI, the user's identification at the F1 interface (e.g. gNB-CU UE F1AP ID, and/or gNB-DU UE F1AP ID), the user's identification at the Xn/X2 interface, and the gNB-DU ID of the user as a DU, the identification of the user as a relay node, and etc.

identification of the radio bearer indication information indicating a type of the radio bearer. The indication information is used to indicate whether the data of the radio bearer is data of a data radio bearer (DRB) or data of a signaling radio bearer (SRB). For the data of the SRB, optionally, the indication information also indicates a type of the SRB, such as SRB0, SRB1, SRB1s, SRB2, SRB2s, SRB3, etc. The indication information may be implicit or explicit. In an embodiment, a type of a radio bearer is implicitly indicated by a name or identification information of the radio bearer. For example, one or more special DRBs may be defined to indicate that the data of the data radio bearers come from all types of SRBs or one type of SRB, and then the names or identification information of the DRBs implicitly indicate that the data of the data radio bearers comes from all types of SRBs or one type of SRB.

identification of the user to which the radio bearer belongs. The user may be a source (sender) or a destination (receiver) of the data of the radio bearer, or may be a forwarder of the data of the radio bearer.

QoS information of the radio bearer which is determined by the relay node, such as QoS parameters at a radio bearer level, and/or QoS parameters of at least one QoS flow comprised in the radio bearer. As an embodiment, see the QoS parameters of the QoS flow defined in TS38.423.

information on a tunnel established for the radio bearer between the anchor/donor node and the relay node, address information of the tunnel on the relay node side, e.g. such as GTP Tunnel Endpoint information (including a transport layer address and a GTP TEID). In an embodiment, if one tunnel is established for the radio bearer, the information on the tunnel includes address information of the tunnel on the relay node side. In an embodiment, if two tunnels are established for the radio bearer, the information on the tunnel includes address information of the tunnels on the relay node side. It should be noted that the one or two established tunnels are both used for transmitting and receiving data belonging to the radio bearer identification of the radio bearer.

4) information on an aggregated radio bearer that is unaccepted

This information may be comprised in the message 5 in step 2. This information may be presented in the following two forms:

a. This information is presented for an aggregated user to which the unaccepted aggregated radio bearer belongs. For one aggregated user, this information may comprise at least one of:

identification information of the aggregated user, such as the user's C-RNTI, the user's identification at the F1 interface (e.g. gNB-CU UE F1AP ID, and/or gNB-DU UE F1AP ID), the user's identification at the Xn/X2 interface, and the gNB-DU ID of the user as a DU, the identification of the user as a relay node, and etc.

information on an unaccepted aggregated radio bearer of the aggregated user. (The radio bearer may comprise one or more newly established radio bearers or may comprise one or more radio bearers that have been established but need to be modified.) For one radio bearer of the aggregated user, the information comprises at least one of the following information:

identification of the radio bearer indication information indicating a type of the radio bearer. The indication information is used to indicate whether the data of the radio bearer is data of a data radio bearer (DRB) or data of a signaling radio bearer (SRB). For the data of the SRB, optionally, the indication information also indicates a type of the SRB, such as SRB0, SRB1, SRB1s, SRB2, SRB2s, SRB3, etc. The indication information may be implicit or explicit. In an embodiment, a type of a radio bearer is implicitly indicated by a name or identification information of the radio bearer. For example, one or more special DRBs may be defined to indicate that the data of the data radio bearers come from all types of SRBs or one type of SRB, and then the names or identification information of the DRBs implicitly indicate that the data of the data radio bearers comes from all types of SRBs or one type of SRB.

identification of the user to which the radio bearer belongs. The user may be a source (sender) or a destination (receiver) of the data of the radio bearer, or may be a forwarder of the data of the radio bearer.

QoS information of the radio bearer which is determined by the relay ndoe, such as QoS parameters at a radio bearer level, QoS parameters of at least one QoS flow comprised in the radio bearer. As an embodiment, see the QoS parameters of the QoS flow defined in TS38.423.

information on unaccepted reasons, such as heavy load, poor channel condition and etc.

b. This information is presented for the unaccepted aggregated radio bearers. For one such radio bearer, the information comprises at least one of the following information:

identification information of the aggregated user to which the radio bearer belongs, such as the user's C-RNTI, the user's identification at the F1 interface (e.g. gNB-CU UE F1AP ID, and/or gNB-DU UE F1AP ID), the user's identification at the Xn/X2 interface, and the gNB-DU ID of the user as a DU, the identification of the user as a relay node, and etc.

identification of the radio bearer indication information indicating a type of the radio bearer. The indication information is used to indicate whether the data of the radio bearer is data of a data radio bearer (DRB) or data of a signaling radio bearer (SRB). For the data of the SRB, optionally, the indication information also indicates a type of the SRB, such as SRB0, SRB1, SRB1s, SRB2, SRB2s, SRB3, etc. The indication information may be implicit or explicit. In an embodiment, a type of a radio bearer is implicitly indicated by a name or identification information of the radio bearer. For example, one or more special DRBs may be defined to indicate that the data of the data radio bearers come from all types of SRBs or one type of SRB, and then the names or identification information of the DRBs implicitly indicate that the data of the data radio bearers comes from all types of SRBs or one type of SRB.

identification of the user to which the radio bearer belongs. The user may be a source (sender) or a destination (receiver) of the data of the radio bearer, or may be a forwarder of the data of the radio bearer.

QoS information of the radio bearer which is determined by the relay node, such as QoS parameters at a radio bearer level, and/or QoS parameters of at least one QoS flow comprised in the radio bearer. As an embodiment, see the QoS parameters of the QoS flow defined in TS38.423.

information on unaccepted reasons, such as heavy load, poor channel condition and etc.

The foregoing embodiments can implement that a relay node user aggregates radio bearers of multiple aggregated users. The achieved effect is as below: there are n radio bearers for the relay node user between the anchor/donor node and the relay node; for each radio bearer, at least one tunnel is established between the anchor/donor node and the relay node; each tunnel is used to send data of one radio bearer of one aggregated user accessing the relay node user. This is different from the prior art. In the prior art, only one tunnel is established for one radio bearer of one user between two nodes (It should be noted that, when the radio bearer supports duplication of data packets, two tunnels can be established. But both of the tunnels are used to transfer data on one bearer of one user). However, in the foregoing described configurations, multiple tunnels can be established for one radio bearer of one relay node user accessing the relay node, and each tunnel is used to transmit data of one radio bearer of one aggregated user accessing the relay node user. FIG. 21 is a diagram showing an example in which a relay node user aggregates data of multiple aggregated users. As shown in FIG. 21, it shows an example in which multiple tunnels are configured for one radio bearer. A relay node user aggregates the radio bearers 1&2&3 of the aggregated user 1 and the radio bearers 1&2&3 of the aggregated user 2. When the relay node user accesses the relay node, it serves the aggregated users accessing the relay node user over three radio bearers (i.e. the radio bearers 1&2& 3 of the relay node user). When the anchor/donor node configures the relay node, six tunnels are established for the radio bearers 1&2&3 of the relay node user, and the addresses of the six tunnels on the anchor/donor node side (i.e. address 1_1_1, address 2_1_1, address 1_2_1, address 2_2_1, address 1_3_1, address 2_3_1) are given in the message 4, and the addresses of the six tunnels on the relay node side (i.e. address 1_1_2, address 2_1_2, address 1_2_2, address 2_2_2, address 1_3_2, address 2_3_2) are given in the message 5.

For the foregoing embodiments, in an embodiment, the information on the radio bearer for the relay node user in the message 4 in step 1 may not contain information on a tunnel related to the radio bearer, which indicates that there is no need to establish, between the anchor/donor node and the relay node, a tunnel for the radio bearers of the relay node user. This is different from the prior art. In the prior art, the message 4 surely contains corresponding tunnel-related information for a radio bearer.

In another embodiment, the message 4 in step 1 may not contain the information on mapping of the radio bearer, so that the relay node may determine, according to the received data packet, to which user and over which radio bearer to send the data packet.

In the above description, in an embodiment, if the anchor/donor node is a CU of a base station and the relay node is a DU of the base station, the message 4 in step 1 may be a UE Context Setup/Modification Request message, and the message 5 in step 2 may be a UE Context Setup/Modification Response message. When the anchor/donor node and the relay node are other network entities, the message 4 in step 1 and the message 5 in step 2 may be of other names.

Form 2: The anchor/donor node configures the relay node as a user served by the anchor/donor node. The anchor/donor node is connected to the relay node indirectly, i.e. via at least one relay node.

FIG. 22 is a diagram showing a signaling flow of an example of an anchor/donor node configuring a relay node (as a user) in such implementation form. As shown in FIG. 22, the anchor/donor node transmits a message 6 to the relay node which is used to configure the relay node. The message 6 comprises at least one of the following information:
- → identification information of a radio bearer. In an embodiment, the radio bearer is one established radio bearer over the air interface when the relay node communicates with other nodes.
- → indication information indicating a type of the radio bearer. The indication information is used to indicate whether the data of the radio bearer is data of a data radio bearer (DRB) or data of a signaling radio bearer (SRB). For the data of the SRB, optionally, the indication information also indicates a type of the SRB, such as SRB0, SRB1, SRB1s, SRB2, SRB2s, SRB3, etc. The indication information may be implicit or explicit. In an embodiment, a type of a radio bearer is implicitly indicated by a name or identification information of the radio bearer. For example, one or more special DRBs may be defined to indicate that the data of the data radio bearers come from all types of SRBs or one type of SRB, and then the names or identification information of the DRBs implicitly indicate that the data of the data radio bearers comes from all types of SRBs or one type of SRB.
- → configuration information of the protocol stack corresponding to the radio bearer represented by the identification information of the radio bearer. This configuration is optional and may comprise at least one of the following information:
    configuration information of the SDAP layer and/or the PDCP layer corresponding to the radio bearer, e.g. see TS38.331 (such as RadioBearerConfig IE) or TS36.331.
    configuration information of the RLC layer corresponding to the radio bearer, e.g. see TS38.331 (such as CellGroupConfig IE) or TS36.331.
    configuration information of the logical channel corresponding to the radio bearer, e.g. see TS38.331 (such as CellGroupConfig IE) or TS36.331

For the radio bearer represented by the above identification information, if it aggregates multiple radio bearers, for one aggregated radio bearer, at least one of the following information is included:
    identification information of the aggregated radio bearer
    indication information indicating a type of the aggregated radio bearer. The indication information is used to indicate whether the data of the radio bearer is data of a data radio bearer (DRB) or data of a signaling radio bearer (SRB). For the data of the SRB, optionally, the indication information also indicates a type of the SRB, such as SRB0, SRB1, SRB1s, SRB2, SRB2s, SRB3, etc. The indication information may be implicit or explicit. In an embodiment, a type of a radio bearer is implicitly indicated by a name or identification information of the radio bearer. For example, one or more special DRBs may be defined to indicate that the data of the data radio bearers come from all types of SRBs or one type of SRB, and then the names or identification information of the DRBs implicitly indicate that the data of the data radio bearers comes from all types of SRBs or one type of SRB.
    identification information of the user to which the aggregated radio bearer belongs. The user may be a source (sender) or a destination (receiver) of the data of the radio bearer, or may be a forwarder of the data of the radio bearer.
    configuration information of the SDAP layer and/or the PDCP layer corresponding to the aggregated radio bearer, e.g. see TS38.331 (such as RadioBearerConfig IE) or TS36.331
- → configuration information of the MAC layer and/or the PHY layer corresponding to the radio bearer, e.g. see TS38.331 (such as CellGroupConfig IE) or TS36.331
- → information on mapping of a radio bearer, e.g. see above.

In an embodiment, the message 6 may provide configurations of the protocol layers below the PDCP layer (such as the RLC layer, the logical channel, the MAC layer, and the PHY layer) for the relay node. That is, the information comprised in the message 6 is as below:
- → identification information of a radio bearer. In an embodiment, the radio bearer is one established over the air interface when the relay node communicates with other nodes.
- → indication information indicating a type of the radio bearer. The indication information is used to indicate whether the data of the radio bearer is data of a data radio bearer (DRB) or data of a signaling radio bearer (SRB). For the data of the SRB, optionally, the indication information also indicates a type of the SRB, such as SRB0, SRB1, SRB1s, SRB2, SRB2s, SRB3, etc. The indication information may be implicit or explicit. In an embodiment, a type of a radio bearer is implicitly indicated by a name or identification information of the radio bearer. For example, one or more special DRBs may be defined to indicate that the data of the data radio bearers come from all types of SRBs or one type of SRB, and then the names or identification information of the DRBs implicitly indicate that the data of the data radio bearers comes from all types of SRBs or one type of SRB.
→ configuration information of the protocol stack corresponding to the radio bearer represented by the identification information of the radio bearer. This configuration is optional and may comprise at least one of the following information:
configuration information of the RLC layer corresponding to the radio bearer, e.g. see TS38.331 (such as CellGroupConfig IE) or TS36.331
configuration information of the logical channel corresponding to the radio bearer, e.g. see TS38.331 (such as CellGroupConfig IE) or TS36.331
→ configuration information of the MAC layer and/or the PHY layer corresponding to the radio bearer, e.g. see TS38.331 (such as CellGroupConfig IE) or TS36.331
→ information on mapping of a radio bearer that is optional, e.g. see above.

In another embodiment, the message 6 may provide configurations of all protocol layers of the relay node. That is, the information comprised in the message 6 is as below:
→ identification information of a radio bearer. In an embodiment, the radio bearer is one established radio bearer over the air interface when the relay node communicates with other nodes.
→ indication information indicating a type of the radio bearer. The indication information is used to indicate whether the data of the radio bearer is data of a data radio bearer (DRB) or data of a signaling radio bearer (SRB). For the data of the SRB, optionally, the indication information also indicates a type of the SRB, such as SRB0, SRB1, SRB1s, SRB2, SRB2s, SRB3, etc. The indication information may be implicit or explicit. In an embodiment, a type of a radio bearer is implicitly indicated by a name or identification information of the radio bearer. For example, one or more special DRBs may be defined to indicate that the data of the data radio bearers come from all types of SRBs or one type of SRB, and then the names or identification information of the DRBs implicitly indicate that the data of the data radio bearers comes from all types of SRBs or one type of SRB.
→ configuration information of the protocol stack corresponding to the radio bearer represented by the identification information of the radio bearer. This configuration is optional and may comprise at least one of the following information:
configuration information of the SDAP layer and/or the PDCP layer corresponding to the radio bearer, e.g. see TS38.331 (such as RadioBearerConfig IE) or TS36.331
configuration information of the RLC layer corresponding to the radio bearer, e.g. see TS38.331 (such as CellGroupConfig IE) or TS36.331
configuration information of the logical channel corresponding to the radio bearer, e.g. see TS38.331 (such as CellGroupConfig IE) or TS36.331
→ configuration information of the MAC layer and/or the PHY layer corresponding to the radio bearer, e.g. see TS38.331 (such as CellGroupConfig IE) or TS36.331

→ information on mapping of a radio bearer, that is optional, e.g. see above.

In an embodiment, the message 6 may provide configurations of the protocol layers below the PDCP layer (such as the RLC layer, the logical channel, the MAC layer, and the PHY layer) for each radio bearer of the relay node, and provide configurations of the SDAP/PDCP layer for each radio bearer aggregated by the radio bearer. In such as case, the information included in the message 6 comprises:
→ identification information of a radio bearer. In an embodiment, the radio bearer is one established radio bearer over the air interface when the relay node communicates with other nodes.
→ indication information indicating a type of the radio bearer. The indication information is used to indicate whether the data of the radio bearer is data of a data radio bearer (DRB) or data of a signaling radio bearer (SRB). For the data of the SRB, optionally, the indication information also indicates a type of the SRB, such as SRB0, SRB1, SRB1s, SRB2, SRB2s, SRB3, etc. The indication information may be implicit or explicit. In an embodiment, a type of a radio bearer is implicitly indicated by a name or identification information of the radio bearer. For example, one or more special DRBs may be defined to indicate that the data of the data radio bearers come from all types of SRBs or one type of SRB, and then the names or identification information of the DRBs implicitly indicate that the data of the data radio bearers comes from all types of SRBs or one type of SRB.
→ configuration information of the protocol stack corresponding to the radio bearer represented by the identification information of the radio bearer. This configuration is optional and may comprise at least one of the following information:
configuration information of the RLC layer corresponding to the radio bearer, e.g. see TS38.331 (such as CellGroupConfig IE) or TS36.331
configuration information of the logical channel corresponding to the radio bearer, e.g. see TS38.331 (such as CellGroupConfig IE) or TS36.331
→ information for aggregated radio bearers. This information is comprised if the radio bearer represented by the identification information of the radio bearer aggregates multiple radio bearers. For one aggregated radio bearer, this information may comprises at least one of the following information:
identification information of the aggregated radio bearer
indication information indicating a type of the aggregated radio bearer. The indication information is used to indicate whether the data of the radio bearer is data of a data radio bearer (DRB) or data of a signaling radio bearer (SRB). For the data of the SRB, optionally, the indication information also indicates a type of the SRB, such as SRB0, SRB1, SRB1s, SRB2, SRB2s, SRB3, etc. The indication information may be implicit or explicit. In an embodiment, a type of a radio bearer is implicitly indicated by a name or identification information of the radio bearer. For example, one or more special DRBs may be defined to indicate that the data of the data radio bearers come from all types of SRBs or some type of SRBs, and then the names or identification information of the DRBs implicitly indicate that the data of the data radio bearers comes from all types of SRBs or some type of SRBs.
identification information of the user to which the aggregated radio bearer belongs. The user may be a source (sender) or a destination (receiver) of the data of the radio bearer, or may be a forwarder of the data of the radio bearer.

configuration information of the SDAP layer and/or the PDCP layer corresponding to the aggregated radio bearer, e.g. see TS38.331 (such as RadioBearerConfig IE) or TS36.331

→ configuration information of the MAC layer and/or the PHY layer corresponding to the radio bearer, e.g. see TS38.331 (such as CellGroupConfig IE) or TS36.331

→ information on mapping of a radio bearer that is optional, e.g. see above.

For this embodiment, FIG. 23 gives an example. FIG. 23 is a schematic diagram showing an example of an anchor/donor node configuring a relay node (as a user). As shown in FIG. 23, three RLC layers are configured for the radio Bearer 1&2&3 respectively. Because Bearer 1 aggregates bearer 1_1 and bearer 1_2, the anchor/donor node configures a SDAP/PDCH layer for each of the bearer 1_1 and bearer 1_2. Thus, there are six SDAP/PDCP layers configured for the bearer 1_1, bearer 1_2, bearer 2_1, bearer 2_2, bearer 3_1 and bearer 3_2, respectively, and there are three RLC layers configured for the Bearer 1, Bearer 2 and Bearer 3 respectively. The relay node may determine to which SDAP/PDCP layer to forward a data packet, according to information included in the data packet after the data packet is processed by the RLC layer.

It is possible to use the above two forms for configuring the relay node simultaneously or in sequence to configure one relay node. It is also possible to use one of the two forms to configure a relay node.

The above description is mainly used to configure a relay node, thereby enabling user data forwarding by the relay node. Hereafter, it provides another aspect of the present invention, namely how to transmit control signaling to an anchor/donor node in a multi-hop network. It is assumed that the anchor/donor node transmits and receives control signaling via a relay node. The anchor/donor node may be a base station or a CU of a base station. The relay node may be a base station or a DU of the base station. In this aspect of the present invention, considering that the anchor/donor node and the relay node are directly connected, the anchor/donor node transmits control signaling to a user of the relay node via the relay node (such a user is called as a relay node user, which may be a relay node or may be a user without a relay function), and the relay node user transmits control signaling to the anchor/donor node via the relay node, as shown in FIG. 24. FIG. 24 is a schematic diagram showing an example of transmission of control signaling between an anchor/donor node and a relay node user.

FIG. 25 is a diagram showing a signaling flow of an example of an anchor/donor node transmitting control signaling to a relay node. As shown in FIG. 25, the process comprises the following steps:

1. step 1: The anchor/donor node transmits a message 7 to the relay node. The message is used to send the control signaling generated by the anchor/donor node to the relay node, and comprises at least one of the following information.

→ identification information of the relay node user, such as the identification information of the relay node user at the anchor/donor node and the identification information of the relay node user at the relay node. If the anchor/donor node is a CU of a base station, the relay node is a DU of the base station, the identifier information is a gNB-CU UE F1AP ID and/or a gNB-DU UE F1AP ID. If the anchor/donor node and the relay node are both base stations, the identification information is an identification of the relay node user on the X2/Xn interface.

→ information related to control signaling. This information may include information related to multiple control signaling messages. For each control signaling message, the related information comprises at least one of the following information:

a container containing control signaling indication information indicating a type of the control signaling contained above. In an embodiment, the indication information indicates a type or an identification of the SRB carrying the control signaling (such as SRB0\1\2\1s\2s\3). In another embodiment, the indication information indicates whether the control signaling contained is control signaling over the F1 interface, control signaling over the X2 interface, control signaling over the Xn interface or RRC signaling over the air interface, and may further indicates whether the control signaling is control signaling associated with a user or control signaling not associated with a user. The indication information may be an implicit indication or an explicit indication.

path indication information related to transmission of the control signaling contained above. This indication information indicates a path for transmitting the control signaling. Different values of the indication information indicate different paths. According to this information, the relay node can learn how to transmit the control singling it receives. Further, the indication information may also be used to indicate that the node receiving the control signaling should send the control signaling to a protocol stack corresponding to the indication information (such as PDCP, RLC, etc.) to process.

identification information of a target recipient node of the control signaling contained above. In an embodiment, the identification information is a user's C-RNTI. In another embodiment, the identification information is a user's identification at the F1 interface (e.g. gNB-CU UE F1AP ID, and/or gNB-DU UE F1AP ID). In a yet embodiment, the identification information is a user's identification at the Xn/X2 interface. In another embodiment, the identification information is a gNB-DU ID of the user as a DU. In another embodiment, the identification information is an identification of the user as a relay node, and etc.

identification information of a radio bearer used by the relay node for transmitting the control signaling contained above to the relay node user indication information indicating a type of the radio bearer used by the relay node for transmitting the control signaling contained above to the relay node user, such as a data radio bearer for transmitting control signaling, a common data radio bearer, existing signaling radio bearers (SRB0\1\2\1s\2s\3), a newly defined signaling radio bearer. The indication information may be explicit, or may be implicit (e.g. obtained from a name or identification of the radio bearer).

Step 2: The relay node transmits the control signaling received in step 1 to the relay node user through the message 8. The message 8 comprises at least one of the following information.

control signaling received in step 1, which is in the container containing control signaling contained in the message 7.

identification information of the target recipient node of the control signaling, which is received in the message 7.

The relay node will follow the "identification information of a radio bearer used by the relay node for transmitting the control signaling contained above to the relay node user" and/or "indication information indicating a type of the radio bearer used by the relay node for transmitting the control signaling contained above to the relay node user" contained in the message 7 when transmitting the message 8. In an embodiment, the control signaling is transmitted to the relay node user over a data radio bearer according to the information in the message 7. In another embodiment, the control signaling is transmitted to the relay node user over an existing or newly defined signaling radio bearer according to the information in the message 7. In a yet embodiment, the control signaling is transmitted to the relay node user over a specific data radio bearer according to the information in the message 7. In another embodiment, the control signaling is transmitted to the relay node user over a default data radio bearer or signaling radio bearer according to the information in the message 7.

In an embodiment, the anchor/donor node is comprised of two logical entities, one entity is used to deal with the control plane of the anchor/donor node (called as the anchor/donor node control plane), and the other entity is used to deal with the user plane of the anchor/donor node (called as the anchor/donor node user plane), and the above control signaling is transmitted to the relay node user over a data radio bearer. FIG. 26 is a schematic diagram showing another example of transmission of control signaling between an anchor/donor node and a relay node user. As shown in FIG. 26, the process comprises the following steps:

step 1: The control plane of the anchor/donor node transmits a message 9 to the user plane of the anchor/donor node. The message 9 is transmitted via control plane signaling, and comprises at least one of the following information:

→ identification information of the relay node user, such as the identification information of the relay node user at the control plane of the anchor/donor node and the identification information of the relay node user at the user plane of the relay node, and the identification information of the relay node user at the relay node. If the anchor/donor node is a CU of a base station, the relay node is a DU of the base station, the identifier information is a gNB-CU UE F1AP ID and/or a gNB-DU UE F1AP ID. If the anchor/donor node and the relay node are both base stations, the identification information is an identification of the relay node user on the X2/Xn interface.

→ information related to control signaling. This information may include information related to multiple control signaling messages. For one control signaling message, the related information comprises at least one of the following information:

a container containing control signaling indication information indicating a type of the control signaling contained above. In an embodiment, the indication information indicates a type of the SRB carrying the control signaling (such as SRB0\1\2\1s\2s\3). In another embodiment, the indication information indicates whether the control signaling contained is control signaling over the F1 interface, control signaling over the X2 interface, control signaling over the Xn interface or RRC signaling over the air interface, and may further indicates whether the control signaling is control signaling associated with a user or control signaling not associated with a user. The indication information may be an implicit indication or an explicit indication.

path indication information related to transmission of the control signaling contained above. This indication information indicates a path for transmitting the control signaling. Different values of the indication information indicate different paths. According to this information, the relay node can learn how to transmit the control singling it receives. Further, the indication information may also be used to indicate that the node receiving the control signaling should send the control signaling to a protocol stack corresponding to the indication information (such as PDCP, RLC, etc.) to process.

identification information of a target recipient node of the control signaling contained above. In an embodiment, the identification information is a user's C-RNTI. In another embodiment, the identification information is a user's identification at the F1 interface (e.g. gNB-CU UE F1AP ID, and/or gNB-DU UE F1AP ID). In a yet embodiment, the identification information is a user's identification at the Xn/X2 interface. In another embodiment, the identification information is a gNB-DU ID of the user as a DU. In another embodiment, the identification information is an identification of the user as a relay node, and etc.

identification information of a radio bearer used by the relay node for transmitting the control signaling contained above to the relay node user.

indication information indicating a type of the radio bearer used by the relay node for transmitting the control signaling contained above to the relay node user, such as a data radio bearer for transmitting control signaling, and a common data radio bearer. The indication information may be explicit, or may be implicit (e.g. obtained from a name or identification of the radio bearer).

In this step, the control signaling carried in the message 9 would have been sent by the control plane of the anchor/donor node to the relay node and then sent by the relay node to the relay node user, but the control signaling needs to be sent through the control signaling over the interface between the control plane of the anchor/donor node and the user plane of the anchor/donor node since the relay node transmits the message over a data radio bearer on the user plane. In an embodiment, the anchor/donor node is a centralized unit (CU) of a base station and the CU is further divided into a centralized unit control plane portion, i.e. CU-CP, and a centralized unit user plane portion, i.e. CU-UP; the relay node is a distributed unit (DU) of the base station; the interface between the CU and the DU is F1; the control signaling over F1 is an F1AP message, which is sent through the control plane over F1; the interface between the CU-CP and the CU-UP is E1; the control signaling over E1 is an E1AP message, which is sent through the control plane over E1. The E1AP message is mainly used by the CU-CP to control the CU-UP. However, in this step, the E1AP message (i.e. the message 9) carries the F1AP message and is sent by the control plane of the anchor/donor node to the user plane of the anchor/donor node. Difference from the prior art is that it need to define a new E1AP message or modify the existing E1Ap message to carry the information contained in the above message 9.

Step 2: The user plane of the anchor/donor node transmits the received control signaling to the relay node via a message 10 according to the information indicated in the message 9.

Step 3: The relay node transmits the control signaling received in the message 10 to the relay node user.

FIG. 27 is a diagram showing a signaling flow of an example of a relay node transmitting control signaling to an anchor/donor node. As shown in FIG. 23, it comprises the following steps:

Step 1: The relay node user transmits a message 12 to the relay node. The message 12 contains control signaling. The control signaling may be generated by the relay node user, or may be received by the relay node user from other users. The control signaling may be RRC signaling, F1AP signaling, X2/Xn signaling, and the like. The control signaling may be transmitted over a data radio bearer, a special data radio bearer for transmitting control signaling, an existing signaling radio bearer, or a newly defined signaling radio bearer.

Step 2: The relay node transmits the received control signaling to the anchor/donor node via a message 13. The message 13 comprises at least one of the following information:

➔ identification information of the relay node user, such as the identification information of the relay node user at the anchor/donor node and the identification information of the relay node user at the relay node. If the anchor/donor node is a CU of a base station, the relay node is a DU of the base station, the identifier information is a gNB-CU UE F1AP ID and/or a gNB-DU UE F1AP ID. If the anchor/donor node and the relay node are both base stations, the identification information is an identification of the relay node user on the X2/Xn interface.

➔ information related to control signaling. This information may include information related to multiple control signaling messages. For each control signaling message, the related information comprises at least one of the following information:
  a container containing control signaling
  indication information indicating a type of the control signaling contained above. In an embodiment, the indication information indicates a type or an identification of the SRB carrying the control signaling (such as SRB0\1\2\ 1 s\2s\3). In another embodiment, the indication information indicates whether the control signaling contained is control signaling over the F1 interface, control signaling over the X2 interface, control signaling over the Xn interface or RRC signaling over the air interface, and may further indicates whether the control signaling is control signaling associated with user or control signaling not associated with a user. The indication information may be an implicit indication or an explicit indication.
  path indication information related to transmission of the control signaling contained above. This indication information indicates a path for transmitting the control signaling. Different values of the indication information indicate different paths. According to this information, the relay node can learn how to transmit the control singling it receives. Further, the indication information may also be used to indicate that the node receiving the control signaling should send the control signaling to a protocol stack corresponding to the indication information (such as PDCP, RLC, etc.) to process.

identification information of a target recipient node of the control signaling contained above. In an embodiment, the identification information is a user's C-RNTI. In another embodiment, the identification information is a user's identification at the F1 interface (e.g. gNB-CU UE F1AP ID, and/or gNB-DU UE F1AP ID). In a yet embodiment, the identification information is a user's identification at the Xn/X2 interface. In another embodiment, the identification information is a gNB-DU ID of the user as a DU. In another embodiment, the identification information is an identification of the user as a relay node, and etc.

When the relay node transmits the message 13, if the message 12 in step 1 is transmitted over a data radio bearer or a special data radio bearer for transmitting control signaling, the relay node needs to put the control signaling received from the message 12 into the message 13 which is the control signaling over the control plane between the relay node and the anchor/donor node. This is different from the prior art. In the prior art, data received over a data radio bearer is always transmitted via a message on the user plane between the anchor/donor node and the relay node. However, in the present invention, data received over a data radio bearer may be transmitted via a message on the control plane between the anchor/donor node and the relay node. In an embodiment, if the anchor/donor node is a CU of a base station, the relay node is a DU of the base station, the relay node receives one or more data packets containing control signaling over a data radio bearer or a special data radio bearer for transmitting control signaling in step 1, then the relay node can put the control signaling contained in the data packets into a F1AP message to send to the anchor/donor node. That is, the F1AP message (message 13) can contain one or more pieces of control signaling from the data radio bearer.

In an embodiment, the anchor/donor node is comprised of two logical entities, one entity is used to deal with the control plane of the anchor/donor node, and the other entity is used to deal with the user plane of the anchor/donor point, and the above control signaling is transmitted by a relay node user to the relay node over a data radio bearer and then transmitted by the relay node on the user plane to the user plane of the anchor/donor node. FIG. 28A is a diagram showing a signaling flow of an example of an anchor/donor node transmitting control signaling to a relay node. As shown in FIG. 28A, the above process comprises the following steps:

1. Step 1: The relay node user transmits control signaling in a message 14 to the relay node, wherein the message 14 is transmitted over a data radio bearer (such as an existing data radio bearer or a special data radio bearer for transmitting control signaling)

2. Step 2: The relay node transmits the control signaling in a message 15 to the user plane of the anchor/donor node, wherein the message 15 is transmitted over a data radio bearer (such as an existing data radio bearer or a special data radio bearer for transmitting control signaling)

3. The user plane of the anchor/donor node transmits a message 16 to the control plane of the anchor/donor node wherein the message 16 is transmitted as control plane signaling. The message 16 comprises at least one of the following information:

➔ identification information of the relay node user, such as the identification information of the relay node user at the control plane of the anchor/donor node and the identification information of the relay node user at the user plane of the relay node, and the identification information of the relay node user at the relay node. If the anchor/donor node is a CU of a base station, the relay node is a DU of the base station, the identifier information is a gNB-CU UE F1AP ID and/or a gNB-DU UE F1AP ID. If the anchor/donor node and the relay node are both base stations, the identification information is an identification of the relay node user on the X2/Xn interface.

→ information related to control signaling. This information may include information related to multiple control signaling messages. For one control signaling message, the related information comprises at least one of the following information:
  a container containing control signaling
  indication information indicating a type of the control signaling contained above. In an embodiment, the indication information indicates a type of the SRB carrying the control signaling (such as SRB0\1\2\ 1 s\2s\3). In another embodiment, the indication information indicates whether the control signaling contained is control signaling over the F1 interface, control signaling over the X2 interface, control signaling over the Xn interface or RRC signaling over the air interface, and may further indicates whether the control signaling is control signaling associated with a user or control signaling not associated with a user. The indication information may be an implicit indication or an explicit indication.
  path indication information related to transmission of the control signaling contained above. This indication information indicates a path for transmitting the control signaling. Different values of the indication information indicate different paths. According to this information, the relay node can learn how to transmit the control singling it receives. Further, the indication information may also be used to indicate that the node receiving the control signaling should send the control signaling to a protocol stack corresponding to the indication information (such as PDCP, RLC, etc.) to process.
  identification information of a source sender node of the control signaling contained above. In an embodiment, the identification information is a user's C-RNTI. In another embodiment, the identification information is a user's identification at the F1 interface (e.g. gNB-CU UE F1AP ID, and/or gNB-DU UE F1AP ID). In a yet embodiment, the identification information is a user's identification at the Xn/X2 interface. In another embodiment, the identification information is a gNB-DU ID of the user as a DU. In another embodiment, the identification information is an identification of the user as a relay node, and etc.

In this step, the control signaling carried in the message 16 would have been sent by the relay node to the control plane of the anchor/donor node, but the control signaling needs to be sent through the control signaling over the interface between the control plane of the anchor/donor node and the user plane of the anchor/donor node because the control signaling is received by the relay node over a data radio bearer on the user plane and then sent by the user plane of the relay node to the user plane of the anchor/donor node. In an embodiment, the anchor/donor node is a centralized unit (CU) of a base station and the CU is further divided into a centralized unit control plane portion, i.e. CU-CP, and a centralized unit user plane portion, i.e. CU-UP; the relay node is a distributed unit (DU) of the base station; the interface between the CU and the DU is F1; the control signaling over F1 is an F1AP message, which is sent through the control plane over F1; the interface between the CU-CP and the CU-UP is E1; the control signaling over E1 is an E1AP message, which is sent through the control plane over E1. The E1AP message is mainly used by the CU-CP to control the CU-UP. However, in this step, the E1AP message (i.e. the message 19) carries the F1AP message and is sent by the user plane of the anchor/donor node to the control plane of the anchor/donor node. Difference from the prior art is that it need to define a new E1AP message or modify the existing E1Ap message to carry the information contained in the above message 16.

Hereafter, it provides a third aspect of the invention, namely, configuring information about addresses used to transmit data of a user radio bearer, so as to realizing transmission of user data in a multi-hop relay network. The information about addresses includes information about the transport layer address (e.g. IP address) and/or GTP TEID, such as the information referred to in section 9.3.2 in TS38.473. As shown in FIG. 28B, the anchor/donor node includes the centralized unit of the anchor/donor node and the distribution unit of the anchor/donor node. In the illustrated network, there are two relay nodes, namely the relay node 1 and the relay node 2, each of which serves a certain number of users. Hereafter, the third aspect of the present invention is illustrated in an example of transmitting data of the user (e.g., user N1) of the relay node 2 between the anchor/donor node and the relay node 2 as an example, wherein the centralized unit of the anchor/donor node, the distributed unit of the anchor/donor node and the relay node2 are involved. As shown in FIG. 28C, the information about addresses involved in the third aspect includes the following information:
  the first address information, which is information about an address on the side of the centralized unit of the anchor/donor node used to transmitting data of the user radio bearer between the centralized unit of the anchor/donor node and the distributed unit of the anchor/donor node.
  the second address information, which is information about an address on the side of the distributed unit of the anchor/donor node used to transmitting data of the user radio bearer between the centralized unit of the anchor/donor node and the distributed unit of the anchor/donor node.
  the third address information, which is information about an address on the side of the centralized unit of the anchor/donor node used to transmitting data of the user radio bearer between the centralized unit of the anchor/donor node and the relay node to which the user accesses.
  the fourth address information, which is information about an address on the side of the relay node used to transmitting data of the user radio bearer between the centralized unit of the anchor/donor node and the relay node to which the user accesses.
  the fifth address information, which is information about an address on the side of the distributed unit of the anchor/donor node used to transmitting data of the user radio bearer between the distributed unit of the anchor/donor node and the relay node to which the user accesses.
  the sixth address information, which is information about an address on the side of the relay node used to transmitting data of the user radio bearer between the distributed unit of the anchor/donor node and the relay node to which the user accesses.

The above address information includes information about the transport layer address (e.g. IP address) and/or GTP TEID, such as the information referred to in section 9.3.2 in TS38.473.

In addition, the uplink data mentioned in this aspect is the data sent by the user to the centralized unit of the anchor/donor node, and the downlink data is the data transmitted by the centralized unit of the anchor/donor node to the user.

In order to realize the data transmission for user N1, it requires configuration between the centralized unit of the anchor/donor node and the distributed unit of the anchor/donor node, and configuration between the centralized unit of the anchor/donor node and the relay node 2.

The configuration process may be an interaction between the first node and the second node wherein the first node may be an anchor/donor node or a centralized unit of the anchor/donor node, and the second node may be a distributed unit of the anchor/donor node or a relay node to which the user accesses (e.g. the relay node 2 shown in FIG. 28C). In such a case, the interaction may be an interaction between the centralized unit of the anchor/donor node and the distributed unit of the anchor/donor node, then the relay node to which the user accesses is called as the fourth node. The interaction also may be an interaction between the centralized unit of the anchor/donor node and the relay node to which the user accesses, then the distributed unit of the anchor/donor node is called as the fourth node. The process is shown in FIG. 28D.

Step a1: the first node sends an address configuration request message (message 17) to the second node, which may be a message containing information associated with the radio bearer of the user accessing the second node, or may be a separate message. The message is used to send to the second node configuration information associated with the data transmission of the user. The configuration information includes at least one of the following information:

Identification information of the user radio bearer used to carry user data. The identification information may include one of the following information: the identification information of the user to which the radio bearer belongs, such as UE ID, and the identification information of the radio bearer, such as DRB ID, SRB ID.

Information about an address on the side of the centralized unit of the anchor/donor node. This information includes at least one of the first address information and the third address information mentioned above. Further, the above-mentioned first address information and third address information may be same (if so, the first address information and the third address information may be represented by a single address), or partly the same (e.g. the transport layer address is the same, or GTP-U TEID is the same), or completely different. This address information may be used in receiving uplink data of the user radio bearer, and/or in transmitting downlink data of the user radio bearer.

Information about an address on the side of the distributed unit of the anchor/donor node. This information includes at least one of the second address information and the fifth address information mentioned above. Further, the above-mentioned second address information and fifth address information may be same (if so, the second address information and the fifth address information may be represented by a single address), or partly the same (e.g. the transport layer address is the same, or GTP-U TEID is the same), or completely different. This address information may be used in receiving downlink data of the user radio bearer, and/or in transmitting uplink data of the user radio bearer.

Information about an address on the side of the relay node to which the user accesses. This information includes at least one of the fourth address information and the sixth address information mentioned above. Further, the above-mentioned fourth address information and sixth address information may be same (if so, the fourth address information and the sixth address information may be represented by a single address), or partly the same (e.g. the transport layer address is the same, or GTP-U TEID is the same), or completely different. This address information may be used in receiving downlink data of the user radio bearer, and/or in transmitting uplink data of the user radio bearer.

Indication information corresponding to the user radio bear. This indication information is contained in a packet (such as an IP packet) carrying the data of the user radio bearer. In an embodiment, the DSCP (Differentiated Service Code Point) field in the packet carrying the data of the user radio bearer is set to carry the indication information. In another embodiment, the Flow Label (Stream Identification) field in the packet carrying the data of the user radio bearer is set to carry the indication information. After receiving the packet containing the indication information, the distributed unit of the anchor/donor node determines that the data contained in the packet belongs to the user radio bearer. Alternatively, after receiving the packet containing the indication information, the distributed unit of the anchor/donor node determines that the data contained in the packet belongs to the user radio bearer according to the indication information combined with the address information contained in the packet, such as the transport layer address and/or GTP-U TEID in the above-mentioned first address information, and/or the transport layer address and/or GTP-U TEID in the above-mentioned second address information, and/or the transport layer address and/or GTP-U TEID in the above-mentioned third.

Indication information indicating the second node to assign a new address to the user radio bear. Upon receiving the indication information, the second node assigns a new address, such as a transport layer address and/or GTP-U TEID, to the user radio bearer.

A list of address information unavailable for the second node side transmitting data of the user radio bearer. This list contains one or more unusable address information, such as transport layer addresses, and/or GTP-U TEIDs.

Information associated with security configuration, which includes at least one of the following information:

Security-related configuration information used in the communication between the centralized unit of the anchor/donor node and the relay nodes to which the user accesses, such as information associated with the IPSec configuration (e.g. a secret key, an encryption algorithm, a decryption algorithm, etc.), or information associated with the PDCP layer configuration. In the case the second node is the distributed unit of the anchor/donor node, this configuration information can help the distributed unit of the anchor/donor node to read the contents of the packets sent in the communication between the centralized unit of the anchor/donor node and the relay node to which the user accesses.

Security-related configuration information used in the communication between the distributed unit of the anchor/donor node and the relay nodes to which the user accesses, such as information associated with the IPSec configuration (e.g. a secret key, an encryption algorithm, a decryption algorithm, etc.), or information associated with the PDCP layer configuration.

Security-related configuration information used in the communication between the centralized unit of the anchor/ donor node and the distributed unit of the anchor/donor node, such as information associated with the IPSec configuration (e.g. a secret key, an encryption algorithm, a decryption algorithm, etc.), or information associated with the PDCP layer configuration.

Further, the above-mentioned second address information and fourth address information may be exactly the same, or partly the same (e.g. the transport layer address is the same, or GTP-U TEID is the same), or completely different. The above-mentioned second address information and sixth address information may be exactly the same, or partly the same (e.g. the transport layer address is the same, or GTP-U TEID is the same), or completely different. If the above-mentioned second address information is exactly or partly the same as the fourth address information or the sixth address information, the same information may be information on the side of the distributed unit of the anchor/donor node or information on the side of the relay node to which the user accesses. In the former case, the same information is firstly transmitted by the distributed unit of the anchor/donor node to the centralized unit of the anchor/donor node, and then transmitted by the centralized unit of the anchor/donor node to the relay node to which the user accesses in accordance with the above step a1. In the latter case, the same information is firstly transmitted by the relay node to which the user accesses, and then transmitted by the centralized unit of the anchor/donor node to the distributed unit of the anchor/donor node in accordance with the above step a1.

The above-mentioned first address information and fifth address information may be exactly the same, or partly the same (e.g. the transport layer address is the same, or GTP-U TEID is the same), or completely different. The above-mentioned third address information and fifth address information may be exactly the same, or partly the same (e.g. the transport layer address is the same, or GTP-U TEID is the same), or completely different. If the above-mentioned first or third address information is exactly or partly the same as the fifth address information, the same information may be information on the side of the distributed unit of the anchor/donor node or information on the side of the centralized unit of the anchor/donor node. In the former case, the same information is firstly transmitted by the distributed unit of the anchor/donor node to the centralized unit of the anchor/donor node, and then transmitted by the centralized unit of the anchor/donor node to the relay node to which the user accesses in accordance with the above step a1. In the latter case, the same information is transmitted by the centralized unit of the anchor/donor node to the distributed unit of the anchor/donor node and the relay node to which the user accesses in accordance with the above step a1, respectively.

Step a2: the second node sends a configuration response message (message 18) to the first node. The message is used to send to the first node configuration information associated with the data transmission of the user. The configuration information includes at least one of the following information:

Identification information of the user radio bearer used to carry user data. The identification information may include one of the following information: the identification information of the user to which the radio bearer belongs, such as UE ID, and the identification information of the radio bearer, such as DRB ID, SRB ID.

Information about an address on the side of the distributed unit of the anchor/donor node. This information includes at least one of the second address information and the fifth address information mentioned above.

Further, the above-mentioned second address information and fifth address information may be same (if so, the second address information and the fifth address information may be represented by a single address), or partly the same (e.g. the transport layer address is the same, or GTP-U TEID is the same), or completely different. This address information may be used in receiving downlink data of the user radio bearer, and/or in transmitting uplink data of the user radio bearer.

Information about an address on the side of the relay node to which the user accesses. This information includes at least one of the fourth address information and the sixth address information mentioned above. Further, the above-mentioned fourth address information and sixth address information may be same (if so, the fourth address information and the sixth address information may be represented by a single address), or partly the same (e.g. the transport layer address is the same, or GTP-U TEID is the same), or completely different. This address information may be used in receiving downlink data of the user radio bearer, and/or in transmitting uplink data of the user radio bearer.

Information associated with security configuration, which includes at least one of the following information:

Security-related configuration information used in the communication between the centralized unit of the anchor/donor node and the relay nodes to which the user accesses, such as information associated with the IPSec configuration (e.g. a secret key, an encryption algorithm, a decryption algorithm, etc.), or information associated with the PDCP layer configuration.

Security-related configuration information used in the communication between the distributed unit of the anchor/donor node and the relay nodes to which the user accesses, such as information associated with the IPSec configuration (e.g. a secret key, an encryption algorithm, a decryption algorithm, etc.), or information associated with the PDCP layer configuration.

Security-related configuration information used in the communication between the centralized unit of the anchor/donor node and the distributed unit of the anchor/donor node, such as information associated with the IPSec configuration (e.g. a secret key, an encryption algorithm, a decryption algorithm, etc.), or information associated with the PDCP layer configuration.

According to the above configuration process, it realizes the transmission of the data of the user radio bearer between the centralized unit of the anchor/donor node, the distributed unit of the anchor/donor node and the relay node to which the user accesses. Hereafter, several embodiments of the transmission of the data of the user radio bearer will be introduced in combination with the above configuration process.

In the following embodiments, the first address information, the second address information, the third address information, the fourth address information, the fifth address information, and the sixth address information are used and denoted as A, B, C, D, E, F, respectively. In addition, each packet may contain the indication information corresponding to the user radio bearer contained in the configuration request message in the above step a1, wherein one or more of the address information A, B, C, D, E, F and the indication information may determine the user radio bearer to which the data belongs, as shown in FIG. 28E:

Embodiment 3-1 (For the downlink, the address information B and D may be completely different or partly different, and for the uplink, the address information A and C may be completely different or partly different or same)

For the downlink, the centralized unit of the anchor/donor node first transmits the data to the distributed unit of the anchor/donor node, and the address information A, B, C, and D is contained in the data packet containing the data of the radio bearer for the user. After receiving the data, the distributed unit of the anchor/donor node removes the address information A and B in the data packet, and then transmits the data packet to the relay node 2. That is to say, the data transmitted between the distributed unit of the anchor/donor node and the relay node 2 only contains the address information C and D. For the downlink, the above address information A and C may be the same or different. For the downlink, the address information B and D may be the address information configured for the distributed unit of the anchor/donor node and the relay node 2 by the centralized unit of the anchor/donor node via the above step a1, respectively, or the address information configured for the centralized unit of the anchor/donor node by the distributed unit of the anchor/donor node and the relay node 2 via the above step a2, respectively.

For the uplink, the relay node 2 transmits the data to the distributed unit of the anchor/donor node, and the address information C and D is contained in the data packet. The distributed unit of the anchor/donor node will add the address information A and B after receiving the data packet. For the uplink, the address information B and D may be the same or different. For the uplink, the above address information A and C is the address information configured for the distributed unit of the anchor/donor node and the relay node 2 by the centralized unit of the anchor/donor node via the above step a1, respectively. The centralized unit of the anchor/donor node may need to configure the address information C for the distributed unit of the anchor/donor node.

Embodiment 3-2 (For the downlink, the address information B and D may be completely different or partly different, and for the uplink, the address information A and C may be completely different or partly different or same)

For the downlink, the centralized unit of the anchor/donor node first transmits the data to the distributed unit of the anchor/donor node, and the address information A and B is contained in the data packet containing the data of the radio bearer for the user. After receiving the data, the distributed unit of the anchor/donor node updates the address information B in the data packet into the address information D, and the address information A may be updated into the address information C or not updated. Then, the data packet is transmitted to the relay node 2. As such, the centralized unit of the anchor/donor node needs to configure the address information A and/or B and/or C and/or D for the distributed unit of the anchor/donor node. For the downlink, the above address information A and C may be the same or different.

For the uplink, the relay node 2 first transmits the data to the distributed unit of the anchor/donor node, and the data packet containing the data of the radio bearer for the user contains the address information C and D. After receiving the data, the distributed unit of the anchor/donor node may update the address information C in the data packet into the address information A or not update the address information C, and may update the address information D into the address information B or not update the address information D. Then, the data packet is transmitted to the centralized unit of the anchor/donor node. As such, the centralized unit of the anchor/donor node needs to configure the address information C and/or D and/or A and/or B for the distributed unit of the anchor/donor node. For the uplink, the above address information B and D may be the same or different.

Embodiment 3-3 (For the downlink, the address information B and D may be the same, and both the address information B and the address information D may be the address information on the side of the distributed unit of the anchor/donor node. For the uplink, the address information A and C may be the same or different)

For the downlink, the data packet transmitted by the centralized unit of the anchor/donor node to the distributed unit of the anchor/donor node contains the address information A and B, and the distributed unit of the anchor/donor node transmits the data packet to the relay node 2 after receiving the data packet. For the downlink, the address information A and C may be the same or different. The anchor/donor node configures the address information C and/or D and/or A and/or B for the relay node 2. In this way, the relay node 2 may determine the radio bearer for the user to which the data packet belongs upon receiving the data packet containing the address information B (the address information B is the address information of the receiving end).

For the uplink, the relay node 2 first transmits the data to the distributed unit of the anchor/donor node, and the data packet containing the data of the radio bearer for the user contains the address information C and D. After receiving the data, the distributed unit of the anchor/donor node may update the address information C in the data packet into the address information A or not update, and may update the address information D into the address information B or not update. Then the data packet is transmitted to the centralized unit of the anchor/donor node. As such, the centralized unit of the anchor/donor node needs to configure the address information C and/or D and/or A and/or B for the distributed unit of the anchor/donor node. For the uplink, the above address information B and D may be the same or different.

Embodiment 3-4 (For the downlink, the address information B and D may be the same, and both the address information B and the address information D may be the address information on the side of the relay node accessed by the user. For the uplink, the address information A and C may be the same or different)

For the downlink, the data packet transmitted by the centralized unit of the anchor/donor node to the distributed unit of the anchor/donor node contains the address information C and D, and the distributed unit of the anchor/donor node transmits the data packet to the relay node 2 after receiving the data packet. For the downlink, the address information A and C may be the same or different. The anchor/donor node configures the address information C and/or D and/or A and/or B for the distributed unit of the anchor/donor node. In this way, the distributed unit of the anchor/donor node may determine the radio bearer for the user to which the data packet belongs upon receiving the data packet containing the address information D (the address information D is the address information of the receiving end).

For the uplink, the relay node 2 first transmits the data to the distributed unit of the anchor/donor node, and the data packet containing the data of the radio bearer for the user contains the address information C and D. After receiving the data, the distributed unit of the anchor/donor node may update the address information C in the data packet into the address information A or not update, and may update the address information D into the address information B or not update. Then the data packet is transmitted to the centralized unit of the anchor/donor node. As such, the centralized unit of the anchor/donor node needs to configure the address information C and/or D and/or A and/or B for the distributed unit of the anchor/donor node. For the uplink, the above address information B and D may be the same or different.

Embodiment 3-5 (For the downlink, the address information B and D may be different or partly different, and the different parts are the information on the side of the distributed unit of the anchor/donor node and the relay node accessed by the user, respectively. For the uplink, the address information A and C may be the same or different.)

For the downlink, the data packet transmitted by the centralized unit of the anchor/donor node to the distributed unit of the anchor/donor node contains the address information A and B. After receiving the data packet, the distributed unit of the anchor/donor node updates the address information B into the address information D, and then transmits it to the relay node 2. The anchor/donor node configures the address information C and/or D and/or A and/or B for the distributed unit of the anchor/donor node. In this way, the distributed unit of the anchor/donor node may determine the radio bearer for the user to which the data packet belongs upon receiving data packet containing the address information B (the address information B is the address information of the receiving end), and update the address information B in the data packet into the address information D. For the downlink, the address information A and C may be the same or different.

For the uplink, the relay node 2 first transmits the data to the distributed unit of the anchor/donor node, and the data packet containing the data of the radio bearer for the user contains the address information C and D. After receiving the data, the distributed unit of the anchor/donor node may update the address information C in the data packet into the address information A or not update, and may update the address information D into the address information B or not update. Then the data packet is transmitted to the centralized unit of anchor/donor node. As such, the centralized unit of the anchor/donor node needs to configure the address information C and/or D and/or A and/or B for the distributed unit of the anchor/donor node. For the uplink, the above address information B and D may be the same or different.

Embodiment 3-6 (For the downlink, the address information B and F may be completely different or partly different, and for the uplink, the address information A and E may be the same or different)

For the downlink, the data packet transmitted by the centralized unit of the anchor/donor node to the distributed unit of the anchor/donor node contains the address information A and B. After receiving the data packet, the distributed unit of the anchor/donor node updates the address information B into the address information F, and then transmits it to the relay node 2. The anchor/donor node configures the address information A and/or B and/or E and/or F for the distributed unit of the anchor/donor node. In this way, the distributed unit of the anchor/donor node may determine the radio bearer for the user to which the data packet belongs upon receiving the data packet containing the address information B (the address information B is the address information of the receiving end), and update the address information B in the data packet into the address information F. For the downlink, the address information A and E may be the same or different, and the distributed unit of the anchor/donor node may update the address information A in the received data into the address information E or not update.

For the uplink, the relay node 2 first transmits the data to the distributed unit of the anchor/donor node, and the data packet containing the data of the radio bearer for the user contains the address information E and F. After receiving the data, the distributed unit of the anchor/donor node may update the address information E in the data packet into the address information A or not update, and may update the address information F into the address information B or not update. Then the data packet is transmitted to the centralized unit of the anchor/donor node. As such, the centralized unit of the anchor/donor node needs to configure the address information A and/or B and/or E and/or F for the distributed unit of the anchor/donor node and/or the relay node 2. If the address information A and/or B and/or E and/or F is configured for the relay node 2, the configured address information may be the address information that is first transmitted to the centralized unit of the anchor/donor node by the distributed unit of the anchor/donor node and then configured for the relay node 2. For the uplink, the above address information B and F may be the same or different.

FIG. 29 is a block diagram showing an exemplary hardware arrangement of an exemplary device in accordance with an embodiment of the disclosure. The hardware arrangement 2900 may be any of the first node (device), the second node (device), and the third node (device) described above. The hardware arrangement 2900 may comprise a processor 2906. The processor 2906 may be a single processing unit or a plurality of processing units for performing various actions of the processes described herein. The arrangement 2900 may further comprise an input unit 2910 for receiving signals from other entities, and an output unit 2904 for providing signals to other entities. The input unit 2910 and the output unit 2904 may be arranged as a single entity or as separate entities.

Moreover, the arrangement 2900 may comprise at least one readable storage medium 2908 in the form of a non-volatile or volatile memory, such as an electrically erasable programmable read only memory (EEPROM), a flash memory, an optical disk, a Blu-ray disk, and/or a hard disk drive. The readable storage medium 2908 may comprise a computer program 2910 comprising computer readable codes/instructions that, when executed by the processor 2906 in the arrangement 2900, cause the hardware arrangement 2900 and/or an apparatus comprising the hardware arrangement 2900 to perform, for example, any of the processes described above in connection with FIGS. 4-13 and any variations thereof.

The computer program 2910 may be configured as computer program codes having computer program modules 2910A-2910C, for example. Thus, in an exemplary embodiment using the hardware arrangement 2900 as a base station, the codes in the computer program of the arrangement 2900 may be executed to perform any of methods illustrated in FIGS. 4-13. However, the computer program 2910 may further comprise other modules for performing various steps of various methods described herein.

The computer program module may substantially perform the various actions in the process shown in any of FIGS. 4-13 to simulate various devices. In other words, when different computer program modules are executed in the processor 2906, they may correspond to various different units of the various devices mentioned herein.

The processor may be a single CPU (Central Processing Unit), or may further comprise two or more processing units. For example, a processor may comprise a general purpose microprocessor, an instruction set processor, and/or a related chipset and/or a special purpose microprocessor (e.g., an application-specific integrated circuit (ASIC)). The processor may further comprise an onboard memory for caching purposes. The computer program may be carried by a computer program product connected to the processor. The computer program product may comprise a computer readable medium having a computer program stored thereon. For example, the computer program product may be a flash memory, a random access memory (RAM), a read only memory (ROM), an EEPROM. In alternative embodiments, the computer program modules described above may be distributed to different computer program products in a form of a memory within a UE.

According to various embodiments, a method for operating a donor node in a wireless communication system comprises transmitting, to a relay node, a first message comprising first information associated with the donor node regarding a plurality of radio bearers for a terminal accessing the relay node; receiving, from the relay node, a second message comprising second information associated with the relay node regarding the plurality of radio bearers for the terminal; and transmitting, to the relay node, data for the terminal. The data is transmitted to the terminal through the plurality of radio bearers based on the first information and the second information.

According to various embodiments, a radio bearer among the plurality of radio bearers aggregates multiple radio bearers. The method further comprises: determining the radio bearer for the terminal accessing the relay node and the multiple radio bearers aggregated by the radio bearer; or determining the radio bearer for the terminal accessing the relay node.

According to various embodiments, the first message comprises one or more of: identification of the terminal accessing the relay node; indication information indicating a type of the terminal accessing the relay node; information on a radio bearer for the terminal accessing the relay node; information on a radio bearer forwarded by the terminal accessing the relay node; information on a tunnel established for the radio bearer between the donor node and the relay node; information on an aggregated multiple radio bearers; information on mapping of a radio bearer; information about an address on a side of the donor node; information about an address on a side of the relay node; indication information corresponding to a radio bearer of the terminal accessing the relay node; indication information indicating the relay node to assign a new address to the radio bearer for the terminal accessing the relay node; a list of address information unavailable for the relay node transmitting data of the radio bearer of the terminal accessing the relay node; and information associated with security configuration.

According to various embodiments, the second message comprises one or more of: identification of the terminal accessing the relay node; information on a radio bearer accepted by the relay node; information on a radio bearer unaccepted by the relay node; information on a radio bearer partly accepted by the relay node; information on mapping of a radio bearer; configuration information of the terminal accessing the relay node that is generated by the relay node; information about an address on a side of the relay node; and information associated with security configuration.

According to various embodiments, the second message further comprises information on an aggregated multiple radio bearers.

According to various embodiments, the donor node comprises a centralized unit of the donor node, and the relay node comprises a distributed unit of the donor node.

According to various embodiments, a method for operating a relay node in a wireless communication system comprises receiving, from a donor node, a first message comprising first information associated with the donor node regarding a plurality of radio bearers for a terminal accessing the relay node; transmitting, to the donor node, a second message comprising second information associated with the relay node regarding the plurality of radio bearers for the terminal; and receiving, from the donor node, data for the terminal. The data is transmitted to the terminal through the plurality of radio bearers based on the first information and the second information.

According to various embodiments, a radio bearer among the plurality of radio bearers aggregates multiple radio bearers. The method further comprises determining the radio bearer for the terminal accessing the relay node and the multiple radio bearers aggregated by the radio bearer; or determining the multiple radio bearers aggregated by the radio bearer.

According to various embodiments, the first message comprises one or more of: identification of the terminal accessing the relay node; indication information indicating a type of the terminal accessing the relay node; information on a radio bearer for the terminal accessing the relay node; information on a radio bearer forwarded by the terminal accessing the relay node; information on a tunnel established for the radio bearer between the donor node and the relay node; information on an aggregated multiple radio bearers; information on mapping of a radio bearer; information about an address on a side of the donor node; information about an address on a side of the relay node; indication information corresponding to a radio bearer of the terminal accessing the relay node; indication information indicating the relay node to assign a new address to the radio bearer for the terminal accessing the relay node; a list of address information unavailable for the relay node transmitting data of the radio bearer of the terminal accessing the relay node; and information associated with security configuration.

According to various embodiments, the second message comprises one or more of: identification of the terminal accessing the relay node; information on a radio bearer accepted by the relay node; information on a radio bearer unaccepted by the relay node; information on a radio bearer partly accepted by the relay node; information on mapping of a radio bearer; configuration information of the terminal accessing the relay node that is generated by the relay node; information about an address on a side of the relay node; and information associated with security configuration.

According to various embodiments, the second message further comprises information on an aggregated multiple radio bearers.

According to various embodiments, the donor node comprises a centralized unit of the donor node, and the relay node comprises a distributed unit of the donor node.

The disclosure has been described in connection with the preferred embodiments. It will be appreciated that various other changes, substitutions and additions may be made by those skilled in the art without departing from the spirit and scope of the disclosure. Therefore, the scope of the disclosure is not limited to the specific embodiments described above, but is defined by the appended claims.

Furthermore, the functions described herein as being implemented in pure hardware, pure software, and/or firmware may also be implemented in dedicated hardware, a combination of general-purpose hardware and software, and the like. For example, functions described as being implemented by dedicated hardware (e.g., a Field Programmable Gate Array (FPGA), an Application Specific Integrated Circuit (ASIC), etc.) may be implemented in a combination

The invention claimed is:

1. A method for operating a donor node in a wireless communication system, the method comprising:
   transmitting, to a relay node, a first message comprising first information associated with the donor node regarding a plurality of radio bearers for a terminal accessing the relay node;
   receiving, from the relay node, a second message comprising second information associated with the relay node regarding the plurality of radio bearers for the terminal; and
   transmitting, to the relay node, data for the terminal,
   wherein the data is transmitted to the terminal through the plurality of radio bearers based on the first information and the second information.

2. The method of claim 1, wherein, a radio bearer among the plurality of radio bearers aggregates multiple radio bearers, the method further comprising:
   determining the radio bearer for the terminal accessing the relay node and the multiple radio bearers aggregated by the radio bearer; or
   determining the radio bearer for the terminal accessing the relay node.

3. The method of claim 1, wherein the first message comprises one or more of:
   identification of the terminal accessing the relay node;
   indication information indicating a type of the terminal accessing the relay node;
   information on a radio bearer for the terminal accessing the relay node;
   information on a radio bearer forwarded by the terminal accessing the relay node;
   information on a tunnel established for the radio bearer between the donor node and the relay node;
   information on an aggregated multiple radio bearers;
   information on mapping of a radio bearer;
   information about an address on a side of the donor node;
   information about an address on a side of the relay node;
   indication information corresponding to a radio bearer of the terminal accessing the relay node;
   indication information indicating the relay node to assign a new address to the radio bearer for the terminal accessing the relay node;
   a list of address information unavailable for the relay node transmitting data of the radio bearer of the terminal accessing the relay node; and
   information associated with security configuration.

4. The method of claim 1, wherein the second message comprises one or more of:
   identification of the terminal accessing the relay node;
   information on a radio bearer accepted by the relay node;
   information on a radio bearer unaccepted by the relay node;
   information on a radio bearer partly accepted by the relay node;
   information on mapping of a radio bearer;
   configuration information of the terminal accessing the relay node that is generated by the relay node;
   information about an address on a side of the relay node; and
   information associated with security configuration.

5. The method of claim 4, wherein the second message further comprises information on an aggregated multiple radio bearers.

6. The method of claim 1, wherein:
   the donor node comprises a centralized unit of the donor node; and
   the relay node comprises a distributed unit of the donor node.

7. A method for operating a relay node in a wireless communication system, the method comprising:
   receiving, from a donor node, a first message comprising first information associated with the donor node regarding a plurality of radio bearers for a terminal accessing the relay node;
   transmitting, to the donor node, a second message comprising second information associated with the relay node regarding the plurality of radio bearers for the terminal; and
   receiving, from the donor node, data for the terminal,
   wherein the data is transmitted to the terminal through the plurality of radio bearers based on the first information and the second information.

8. The method of claim 7, wherein a radio bearer among the plurality of radio bearers aggregates multiple radio bearers, the method further comprising:
   determining the radio bearer for the terminal accessing the relay node and the multiple radio bearers aggregated by the radio bearer; or
   determining the multiple radio bearers aggregated by the radio bearer.

9. The method of claim 7, wherein the first message comprises one or more of:
   identification of the terminal accessing the relay node;
   indication information indicating a type of the terminal accessing the relay node;
   information on a radio bearer for the terminal accessing the relay node;
   information on a radio bearer forwarded by the terminal accessing the relay node;
   information on a tunnel established for the radio bearer between the donor node and the relay node;
   information on an aggregated multiple radio bearers;
   information on mapping of a radio bearer;
   information about an address on a side of the donor node;
   information about an address on a side of the relay node;
   indication information corresponding to a radio bearer of the terminal accessing the relay node;
   indication information indicating the relay node to assign a new address to the radio bearer for the terminal accessing the relay node;
   a list of address information unavailable for the relay node transmitting data of the radio bearer of the terminal accessing the relay node; and
   information associated with security configuration.

10. The method of claim 7, wherein the second message comprises one or more of:
    identification of the terminal accessing the relay node;
    information on a radio bearer accepted by the relay node;
    information on a radio bearer unaccepted by the relay node;
    information on a radio bearer partly accepted by the relay node;
    information on mapping of a radio bearer;
    configuration information of the terminal accessing the relay node that is generated by the relay node;
    information about an address on a side of the relay node; and
    information associated with security configuration.

11. The method of claim 10, wherein the second message further comprises information on an aggregated multiple radio bearers.

12. The method of claim 7, wherein:
the donor node comprises a centralized unit of the donor node; and
the relay node comprises a distributed unit of the donor node.

13. A donor node, comprising:
a processor; and
a memory coupled to the processor, the memory storing instructions that, when executed by the processor, cause the processor to:
transmit, to a relay node, a first message comprising first information associated with the donor node regarding a plurality of radio bearers for a terminal accessing the relay node;
receive, from the relay node, a second message comprising second information associated with the relay node regarding the plurality of radio bearers for the terminal; and
transmit, to the relay node, data for the terminal,
wherein the data is transmitted to the terminal through the plurality of radio bearers based on the first information and the second information.

14. The donor node of claim 13, wherein a radio bearer among the plurality of radio bearers aggregates multiple radio bearers, and the memory stores instructions that, when executed by the processor, cause the processor to:
determine the radio bearer for the terminal accessing the relay node and the multiple radio bearers aggregated by the radio bearer; or
determine the radio bearer for the terminal accessing the relay node.

15. The donor node of claim 13, wherein the first message comprises one or more of:
identification of the terminal accessing the relay node;
indication information indicating a type of the terminal accessing the relay node;
information on a radio bearer for the terminal accessing the relay node;
information on a radio bearer forwarded by the terminal accessing the relay node;
information on a tunnel established for the radio bearer between the donor node and the relay node;
information on an aggregated multiple radio bearers;
information on mapping of a radio bearer;
information about an address on a side of the donor node;
information about an address on a side of the relay node;
indication information corresponding to a radio bearer of the terminal accessing the relay node;
indication information indicating the relay node to assign a new address to the radio bearer for the terminal accessing the relay node;
a list of address information unavailable for the relay node transmitting data of the radio bearer of the terminal accessing the relay node; and
information associated with security configuration.

16. The donor node of claim 13, wherein the second message comprises one or more of:
identification of the terminal accessing the relay node;
information on a radio bearer accepted by the relay node;
information on a radio bearer unaccepted by the relay node;
information on a radio bearer partly accepted by the relay node;
information on mapping of a radio bearer;
configuration information of the terminal accessing the relay node that is generated by the relay node;
information about an address on a side of the relay node; and
information associated with security configuration.

17. A relay node, comprising:
a processor; and
a memory coupled to the processor, the memory storing instructions that, when executed by the processor, cause the processor to:
receive, from a donor node, a first message comprising first information associated with the donor node regarding a plurality of radio bearers for a terminal accessing the relay node;
transmit, to the donor node, a second message comprising second information associated with the relay node regarding the plurality of radio bearers for the terminal; and
receive, from the donor node, data for the terminal,
wherein the data is transmitted to the terminal through the plurality of radio bearers based on the first information and the second information.

18. The relay node of claim 17, wherein a radio bearer among the plurality of radio bearers aggregates multiple radio bearers, and the memory stores instructions that, when executed by the processor, cause the processor to:
determine the radio bearer for the terminal accessing the relay node and the multiple radio bearers aggregated by the radio bearer; or
determine the multiple radio bearers aggregated by the radio bearer.

19. The relay node of claim 17, wherein the first message comprises one or more of:
identification of the terminal accessing the relay node;
indication information indicating a type of the terminal accessing the relay node;
information on a radio bearer for the terminal accessing the relay node;
information on a radio bearer forwarded by the terminal accessing the relay node;
information on a tunnel established for the radio bearer between the donor node and the relay node;
information on an aggregated multiple radio bearers;
information on mapping of a radio bearer;
information about an address on a side of the donor node;
information about an address on a side of the relay node;
indication information corresponding to a radio bearer of the terminal accessing the relay node;
indication information indicating the relay node to assign a new address to the radio bearer for the terminal accessing the relay node;
a list of address information unavailable for the relay node transmitting data of the radio bearer of the terminal accessing the relay node; and
information associated with security configuration.

20. The relay node of claim 17, wherein the second message comprises one or more of:
identification of the terminal accessing the relay node;
information on a radio bearer accepted by the relay node;
information on a radio bearer unaccepted by the relay node;
information on a radio bearer partly accepted by the relay node;
information on mapping of a radio bearer;
configuration information of the terminal accessing the relay node that is generated by the relay node;

information about an address on a side of the relay node; and information associated with security configuration.

\* \* \* \* \*